(12) United States Patent
Sakai et al.

(10) Patent No.: US 11,732,884 B2
(45) Date of Patent: Aug. 22, 2023

(54) LIGHT-EMITTING DEVICE, OPTICAL DEVICE, AND INFORMATION PROCESSING DEVICE COMPRISING PLURAL WIRING MEMBERS AND CIRCUIT ELEMENTS ON SIDE SURFACES OF A LIGHT EMITTING ELEMENT ARRAY

(71) Applicant: FUJIFILM BUSINESS INNOVATION CORP., Tokyo (JP)

(72) Inventors: Kazuhiro Sakai, Ebina (JP); Daisuke Iguchi, Ebina (JP); Takeshi Minamiru, Ebina (JP); Yoshinori Shirakawa, Ebina (JP); Tomoaki Sakita, Ebina (JP); Tsutomu Otsuka, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 222 days.

(21) Appl. No.: 17/358,866

(22) Filed: Jun. 25, 2021

(65) Prior Publication Data

US 2021/0325034 A1    Oct. 21, 2021

Related U.S. Application Data

(63) Continuation of application No. PCT/JP2019/024550, filed on Jun. 20, 2019.

(30) Foreign Application Priority Data

Mar. 20, 2019    (JP) .................................. 2019-053387

(51) Int. Cl.
*F21V 23/00*    (2015.01)
*F21V 33/00*    (2006.01)
(Continued)

(52) U.S. Cl.
CPC ............ *F21V 33/0052* (2013.01); *G01J 1/08* (2013.01); *G06F 1/1686* (2013.01); *G06F 1/189* (2013.01);
(Continued)

(58) Field of Classification Search
CPC .. F21V 23/00; F21V 33/00; G01J 1/02; G06F 1/16; G06F 1/18; G06F 1/26; H01L 27/156
(Continued)

(56) References Cited

U.S. PATENT DOCUMENTS 6,130,873 A    10/2000 Lazarev et al.
6,208,609 B1    3/2001 Hang et al.
(Continued)

FOREIGN PATENT DOCUMENTS

CN    103178442 A    6/2013
EP    2 610 978 A2    7/2013
(Continued)

OTHER PUBLICATIONS

Sep. 17, 2019 International Search Report issued in International Patent Application No. PCT/JP2019/024550.
(Continued)

*Primary Examiner* — Que Tan Le
(74) *Attorney, Agent, or Firm* — Oliff PLC

(57) ABSTRACT

A light-emitting device includes a wiring substrate, a base member provided on the wiring substrate, a light-emitting element array that has a first side surface and a second side surface facing each other, that has a third side surface and a fourth side surface facing each other and connecting the first side surface and the second side surface, and that is provided on the base member, a drive unit that is provided on the wiring substrate at a side of the first side surface and drives the light-emitting element array, a first circuit element that (Continued)

is provided on the base member at the side of the first side surface, a second circuit element that is provided on the base member at a side of the second side surface and has a larger occupation area on the base member than the first circuit element, and wiring members that are provided at a side of the third side surface and at a side of the fourth side surface and extend from an upper surface electrode of the light-emitting element array toward an outer side of the light-emitting element array.

20 Claims, 9 Drawing Sheets

(51) Int. Cl.
| | | |
|---|---|---|
| *G06F 1/16* | (2006.01) | |
| *G06F 1/18* | (2006.01) | |
| *G06F 21/32* | (2013.01) | |
| *G06V 40/16* | (2022.01) | |
| *G01J 1/08* | (2006.01) | |
| *H01S 5/0239* | (2021.01) | |
| *F21Y 105/16* | (2016.01) | |
| *G01S 7/00* | (2006.01) | |
| *G01S 17/00* | (2020.01) | |

(52) U.S. Cl.
CPC ............ *G06F 21/32* (2013.01); *G06V 40/161* (2022.01); *H01S 5/0239* (2021.01); *F21Y 2105/16* (2016.08); *G01S 7/00* (2013.01); *G01S 17/00* (2013.01)

(58) Field of Classification Search
USPC .............................................. 250/214 R, 205
See application file for complete search history.

(56) References Cited

U.S. PATENT DOCUMENTS

| | | | |
|---|---|---|---|
| 8,675,706 | B2 | 3/2014 | Seurin et al. |
| 8,783,893 | B1 | 7/2014 | Seurin et al. |
| 10,453,759 | B2 * | 10/2019 | Iguchi ................... G09G 3/006 |
| 2005/0023450 | A1 | 2/2005 | Ito |
| 2008/0173800 | A1 | 7/2008 | Ito |
| 2013/0163626 | A1 | 6/2013 | Seurin et al. |
| 2014/0071427 | A1 | 3/2014 | Last |
| 2014/0218898 | A1 | 8/2014 | Seurin et al. |
| 2017/0307736 | A1 | 10/2017 | Donovan |
| 2018/0136330 | A1 | 5/2018 | Nihei et al. |
| 2019/0335073 | A1 | 10/2019 | Yamashita et al. |

FOREIGN PATENT DOCUMENTS

| | | |
|---|---|---|
| JP | 2000-149319 A | 5/2000 |
| JP | 2005-043192 A | 2/2005 |
| JP | 2018-022739 A | 2/2018 |
| JP | 2018-054769 A | 4/2018 |
| JP | 2018-080997 A | 5/2018 |
| KR | 10-2005-0082640 A | 8/2005 |

OTHER PUBLICATIONS

Sep. 17, 2019 Written Opinion issued in International Patent Application No. PCT/JP2019/024550.

Nov. 23, 2022 Search Report issued in European Patent Application No. 19920281.3.

Mar. 7, 2023 Office Action issued in Japanese Patent Application No. 2019-053387.

\* cited by examiner

LIGHT-EMITTING DEVICE, OPTICAL DEVICE, AND INFORMATION PROCESSING DEVICE COMPRISING PLURAL WIRING MEMBERS AND CIRCUIT ELEMENTS ON SIDE SURFACES OF A LIGHT EMITTING ELEMENT ARRAY

CROSS-REFERENCE TO RELATED APPLICATIONS

This is a continuation of International Application No. PCT/JP2019/024550 filed on Jun. 20, 2019, and claims priority from Japanese Patent Application No. 2019-053387 filed on Mar. 20, 2019.

BACKGROUND

1. Technical Field

The present invention relates to a light-emitting device, an optical device, and an information processing device.

2. Related Art

JP-A-2018-54769 discloses an imaging device including a light source, a light diffusing member that includes plural lens provided adjacent to one another on a predetermined plane and that diffuses light emitted from the light source, and an image pickup device that receives reflected light that is light diffused by the light diffusing member and reflected by a subject. The plural lenses are disposed such that a period of an interference pattern of the diffused light is three pixels or less.

SUMMARY

When it is desired to reduce inductance of a circuit that drives a light-emitting element array, a wiring such as a bonding wire may be provided not only at one side surface side of the light-emitting element array, but also at plural side surface sides. Further, plural circuit elements such as a light receiving element and a temperature detecting element may need to be disposed close to the side surfaces of the light-emitting element array. In such a case, a configuration is conceivable in which circuit elements are disposed on the base member at a side of the light-emitting element array close to a drive unit and on the base member at a side opposite to the drive unit across the light-emitting element array, and a wiring such as a bonding wire is provided at the remaining side surface side. However, in a case where sizes of the plural circuit elements are different from one another, when a larger circuit element is disposed at the side close to the drive unit, it is difficult to bring the drive unit and the light-emitting element array close to each other, and inductance of the circuit may increase.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Aspects of non-limiting embodiments of the present disclosure relate to provide a light-emitting device or the like having a structure in which it is easy to bring a drive unit and a light-emitting element array close to each other as compared with a structure in which a circuit element having a large occupation area is provided at a side of the light-emitting element array close to the drive unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emitting device including a wiring substrate, a base member provided on the wiring substrate, a light-emitting element array that has a first side surface and a second side surface facing each other, that has a third side surface and a fourth side surface facing each other and connecting the first side surface and the second side surface, and that is provided on the base member, a drive unit that is provided on the wiring substrate at a side of the first side surface and drives the light-emitting element array, a first circuit element that is provided on the base member at the side of the first side surface, a second circuit element that is provided on the base member at a side of the second side surface and has a larger occupation area on the base member than the first circuit element, and wiring members that are provided at a side of the third side surface and at a side of the fourth side surface and extend from an upper surface electrode of the light-emitting element array toward an outer side of the light-emitting element array.

BRIEF DESCRIPTION OF THE DRAWINGS

Exemplary embodiments of the present invention will be described in detail based on the following figures, wherein:

FIGS. 5(a) and 5(b) are diagrams showing an example of a light diffusing member, in which FIG. 5(a) is a plan view and FIG. 5(b) is a cross-sectional view taken along a line VB-VB in FIG. 5(a);

FIG. 7(a) is a plan view, FIG. 7(b) is a cross-sectional view taken along a line VIIB-VIIB in FIG. 7(a), and FIG. 7(c) is a cross-sectional view taken along a line VIIC-VIIC in FIG. 7(a);

FIG. 8(a) shows a front surface of the wiring substrate, FIG. 8(b) shows a front surface of the base member, and FIG. 8(c) shows a back surface of the base member.

DETAILED DESCRIPTION

Hereinafter, exemplary embodiments of the present invention will be described in detail with reference to the accompanying drawings.

In many cases, an information processing device identifies whether a user who has accessed the information processing device is permitted to access the information processing device, and permits the use of the information processing device that is an own device only when it is authenticated that it is a user whose access is permitted. An authentication method of a user by a password, a fingerprint, an iris, or the like has been used so far. Recently, there is a demand for an authentication method having a higher security. Such a method including performing an authentication based on a three-dimensional image such as a shape of a face of a user.

Here, an example in which the information processing device is a portable information processing terminal will be described, and the information processing device authenticates a user by recognizing a shape of a face that is captured as a three-dimensional image. The information processing device may be applied to an information processing device such as a personal computer (PC) other than a portable information processing terminal.

Further, a configuration, a function, a method, and the like described in the present exemplary embodiment may also be applied to recognize, as an object to be measured, a three-dimensional image other than a shape of a face. That is, the present invention may be applied to recognize a shape of an object other than a face. Further, a distance to an object to be measure is not limited.

(Information Processing Device 1)

Figure 1:
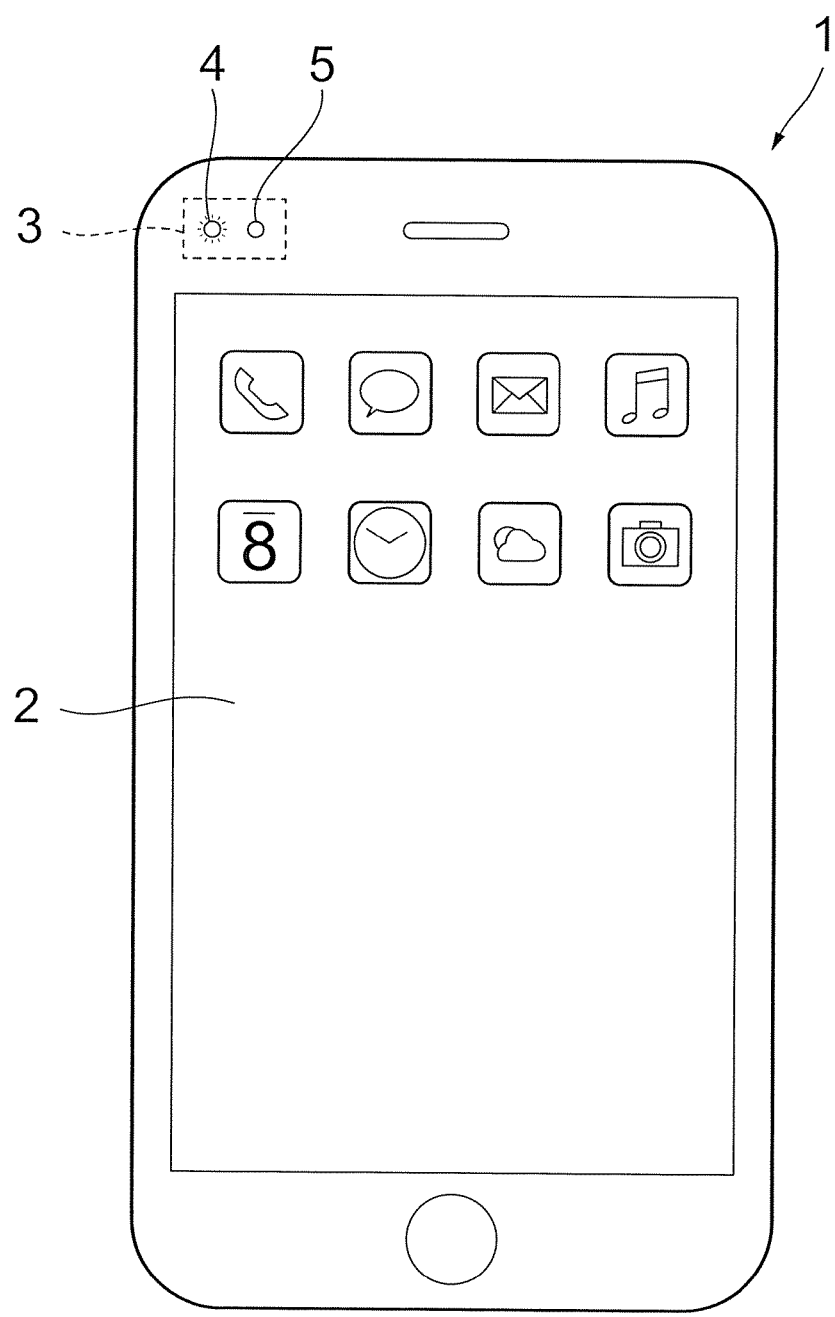
FIG. 1 is a diagram showing an example of an information processing device.

FIG. 1 is a diagram showing an example of an information processing device 1. As described above, the information processing device 1 is, for example, a portable information processing terminal.

The information processing device 1 includes a user interface unit (hereinafter, referred to as a UI unit) 2 and an optical device 3 that captures a three-dimensional image. The UI unit 2 is configured by integrating, for example, a display device that displays information to a user and an input device to which an instruction for an information processing is input by an operation of the user. The display device is, for example, a liquid crystal display or an organic EL display, and the input device is, for example, a touch panel.

The optical device 3 includes a light-emitting device 4 and a three-dimensional sensor (hereinafter, referred to as a 3D sensor) 5. The light-emitting device 4 radiates light toward an object to be measured, that is, a face in the example described here, in order to acquire a three-dimensional image. The 3D sensor 5 acquires the light that is radiated by the light-emitting device 4, is reflected by the face, and is returned. Here, the three-dimensional image of the face is acquired based on a so-called time of flight (TOF) method based on flight time of light. Hereinafter, when a three-dimensional image of a face is acquired, the face is referred to as an object to be measured. A three-dimensional image of an object to be measure other than a face may be acquired. The acquisition of a three-dimensional image may be referred to as 3D sensing. The 3D sensor 5 is an example of the light receiving unit.

The information processing device 1 is implemented as a computer including a CPU, a ROM, a RAM, and the like. The ROM includes a non-volatile rewritable memory such as a flash memory. Then, programs and constants stored in the ROM are loaded to the RAM and are executed by the CPU, so that the information processing device 1 is operated and various information processings are executed.

Figure 2:
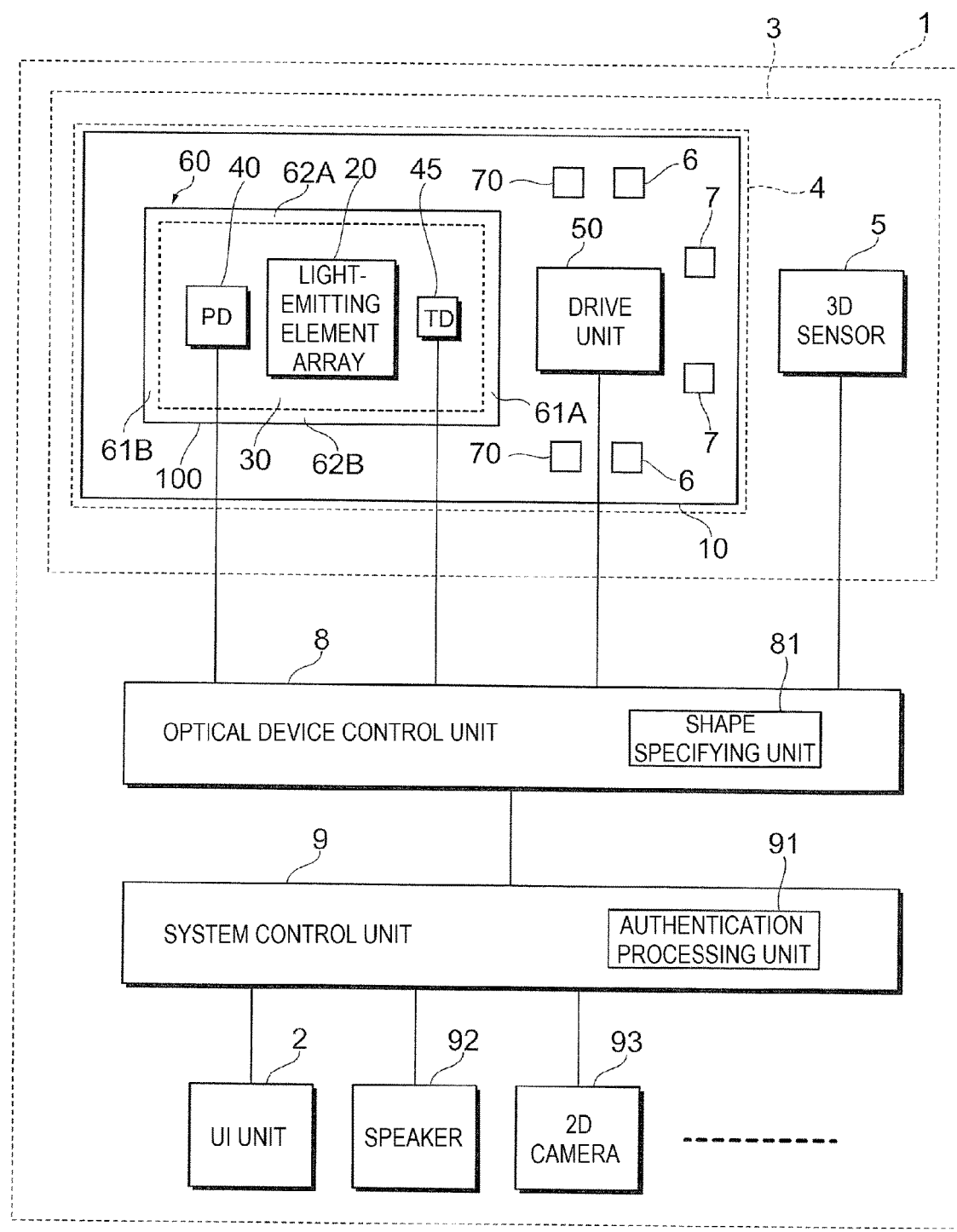
FIG. 2 is a block diagram showing a configuration of the information processing device.

FIG. 2 is a block diagram showing a configuration of the information processing device 1.

The information processing device 1 includes the optical device 3 described above, an optical device control unit 8, and a system control unit 9. The optical device control unit 8 controls the optical device 3. The optical device control unit 8 includes a shape specifying unit 81. The system control unit 9 controls the entire information processing device 1 as a system. The system control unit 9 includes an authentication processing unit 91. The UI unit 2, a speaker 92, and a two-dimensional camera (indicated by a 2D camera in FIG. 2) 93, and the like are connected to the system control unit 9.

Hereinafter, the components described above will be described in order.

The light-emitting device 4 provided in the optical device 3 includes a wiring substrate 10, a base member 100, a light-emitting element array 20, a light diffusing member 30, and a light receiving element for monitoring a light amount (referred to as a PD in FIG. 2 and the following description) 40, a temperature detecting element (referred to as TD in FIG. 2 and the following description) 45, a drive unit 50, a holding unit 60, and a capacitor 70. The light-emitting device 4 further includes passive elements such as a resistor element 6 and a capacitor 7 in order to operate the drive unit 50. Although two capacitors 70 are shown, the number of the capacitors 70 may be one or more than two. Further, plural resistor elements 6 and plural capacitors 7 may be provided. Here, the capacitor 70, the 3D sensor 5, the resistor element 6, the capacitor 7, and the like other than the light-emitting element array, the PD 40, and the drive unit 50 may be referred to as circuit components without being distinguished from one another.

The light-emitting element array 20, the PD 40, and the TD 45 are provided on the base member 100. The base member 100 is formed of an electrically insulating member. Then, the base member 100, the drive unit 50, the capacitor 70, the resistor element 6, and the capacitor 7 are provided on the wiring substrate 10.

The light-emitting element array 20 is configured as an array in which plural light-emitting elements are two-dimensionally arranged (see FIG. 3 to be described later). Each of the light-emitting elements is, for example, a vertical cavity surface emitting laser element (VCSEL). An example in which the light-emitting element is a vertical cavity surface emitting laser element (VCSEL) will be described in the following description. The vertical cavity surface emitting laser element (VCSEL) is referred to as a VCSEL. The light-emitting element array 20 emits light in a direction perpendicular to a front surface of the wiring substrate 10 or a front surface of the base member 100. When three-dimensional sensing is performed using the ToF method, the light-emitting element array 20 is driven by the drive unit 50 and is required to emit pulsed light (hereinafter, referred to as an emitted light pulse) having, for example, 100 MHz or more and a rise time of 1 ns or less. In the case of face authentication, a distance of light radiation is about 10 cm to about 1 m. A range in which a 3D shape is measured is about 1 m square. Therefore, the light-emitting element array 20 is required to have a large output and efficiently dissipate heat generated by the light-emitting element array 20. A distance of light radiation is referred to as a measurement distance, and a range in which a 3D shape of an object to be measured is measured is referred to as a measurement range or a radiation range. A surface virtually provided in the measurement range or the radiation range is referred to as an irradiation surface.

The PD 40 is a photodiode of a pin type or the like that outputs an electric signal corresponding to an amount of received light (hereinafter, referred to as a received light amount). The PD 40 includes a p type Si region serving as an anode, an i (intrinsic) type Si region, and an n type Si region serving as a cathode. An anode electrode is provided in the p type Si region, and a cathode electrode is provided in the n type Si region. The PD 40 is an example of the light receiving element, and is an example of the first circuit element.

The TD 45 is a temperature sensor element that measures a temperature of the base member 100. The TD 45 is, for example, a negative temperature coefficient thermistor (NTC) of a front surface mount type or a positive temperature coefficient thermistor (PTC). A resistance value of the negative temperature coefficient thermistor is reduced when a temperature increases, and a resistance value of the positive temperature coefficient thermistor rapidly increases when a temperature exceeds a certain constant temperature. The TD 45 uses the above characteristics to detect a temperature of the base member 100 and indirectly monitor a temperature of the light-emitting element array 20. Therefore, the TD 45 may be disposed close to the light-emitting element array 20. Although a thermistor does not have polarity, other temperature sensor elements may have polarity. The TD 45 is a circuit element other than a light receiving element, and is an example of the second circuit element.

The light diffusing member 30 is provided in a manner of covering the light-emitting element array 20 and the PD 40. That is, the light diffusing member 30 is provided to be separated at a predetermined distance from the light-emitting element array 20 and the PD 40 on the base member 100 by the holding unit 60 provided on the base member 100. The light diffusing member 30 covers the light-emitting element array 20 and the PD 40 refers to that the light diffusing member 30 is provided on an emission path of light emitted from the light-emitting element array 20, and the light emitted from the light-emitting element array 20 is provided in a manner of passing through the light diffusing member 30. As will be described later, the light diffusing member 30 covers the light-emitting element array 20 and the PD 40 refers to that the light-emitting element array 20 and the PD 40 overlap the light diffusing member 30 in a plan view. Here, the plan view refers to a view in a case of viewing in an xy plane in FIG. 3, FIG. 7(a), and the like to be described later. The PD 40 may be disposed close to the light-emitting element array 20 at a position covered by the light diffusing member 30, so that the PD 40 is likely to receive a part of light reflected by the light diffusing member 30 among the light emitted from the light-emitting element array 20. Here, the light diffusing member 30 is provided in a manner of covering the TD 45. Alternatively, the light diffusing member 30 may not cover the TD 45. When the light diffusing member 30 does not cover the TD 45, an area of the expensive light diffusing member 30 may be reduced.

The holding unit 60 includes walls 61A, 61B, 62A, and 62B provided in a manner of surrounding the light-emitting element array 20, the PD 40, and the TD 45. Here, it is assumed that an outer shape of the base member 100, an outer shape of the light diffusing member 30, and an outer shape of the holding unit 60 are the same. Therefore, outer edges of the base member 100, the light diffusing member 30, and the holding unit 60 overlap one another. The outer shape of the base member 100 may be larger than the outer shape of the light diffusing member 30 or the outer shape of the holding unit 60.

Details of the wiring substrate 10, the base member 100, the light-emitting element array 20, the light diffusing member 30, the drive unit 50, and the holding unit 60 in the light-emitting device 4 will be described later.

The 3D sensor 5 includes plural light receiving cells. For example, each light receiving cell is configured to receive pulsed reflected light (hereinafter, referred to as a received light pulse) from an object to be measured to which an emitted light pulse from the light emitting element array 20 is emitted, and accumulate electric charges corresponding to a time until the light receiving cell receives the pulsed reflected light for each light receiving cell. The 3D sensor 5 is implemented as a device having a CMOS structure in which each light receiving cell includes two gates and electric charge accumulating units corresponding to the gates. Then, generated photoelectrons are transferred to any one of the two electric charge accumulating units at high speed by alternately applying pulses to the two gates. Charges corresponding to a phase difference between the emitted light pulse and the received light pulse are accumulated in the two electric charge accumulating units. Then, the 3D sensor 5 outputs, as a signal, a digital value corresponding to the phase difference between the emitted light pulse and the received light pulse for each light receiving cell via an AD converter. That is, the 3D sensor 5 outputs a signal corresponding to a time from when light is emitted from the light-emitting element array 20 to when the light is received by the 3D sensor 5. The AD converter may be provided in the 3D sensor 5 or may be provided outside the 3D sensor 5.

As described above, in the case of face authentication, the light-emitting element array 20 is required to radiate light in a radiation range of about 1 m square at a distance of about 10 cm to about 1 m. Then, the 3D sensor 5 receives reflected light from the object to be measured to measure a 3D shape of the object to be measured. Therefore, the light-emitting element array 20 is required to have a large output. Therefore, it is required to efficiently dissipate heat from the light-emitting element array 20.

The shape specifying unit 81 of the optical device control unit 8 acquires, from the 3D sensor 5, the digital value obtained for each light receiving cell, and calculates a distance to the object to be measured for each light receiving cell. Then, a 3D shape of the object to be measured is specified according to the calculated distance.

The authentication processing unit 91 of the system control unit 9 performs an authentication processing related to the use of the information processing device 1 when the 3D shape of the object to be measured that is a specifying result specified by the shape specifying unit 81 is a 3D shape stored in advance in the ROM or the like. The authentication processing related to the use of the information processing device 1 is, for example, a processing of determining whether to permit the use of the information processing device 1 that is an own device. For example, when it is determined that the 3D shape of the face that is the object to be measured matches a face shape stored in a storage member such as the ROM, the use of the information processing device 1 including various applications provided by the information processing device 1 is permitted.

The shape specifying unit 81 and the authentication processing unit 91 are configured by, for example, a program. In addition, the shape specifying unit 81 and the authentication processing unit 91 may be configured by an integrated circuit such as an ASIC or an FPGA. Further, the shape specifying unit 81 and the authentication processing unit 91 may be configured by software such as a program and an integrated circuit such as an ASIC.

In FIG. 2, the optical device 3, the optical device control unit 8, and the system control unit 9 are separately shown. Alternatively, the system control unit 9 may include the optical device control unit 8. The optical device control unit 8 may be included in the optical device 3. Further, the optical device 3, the optical device control unit 8, and the system control unit 9 may be integrated.

Next, before describing the light-emitting device 4, the light-emitting element array 20, the light diffusing member 30, and a circuit that drives the light-emitting element array 20 that are provided in the light-emitting device 4 will be described. The circuit that drives the light-emitting element array 20 includes the drive unit 50, the capacitor 70, the PD 40, and the TD 45.

(Configuration of Light-Emitting Element Array 20)

Figure 3:
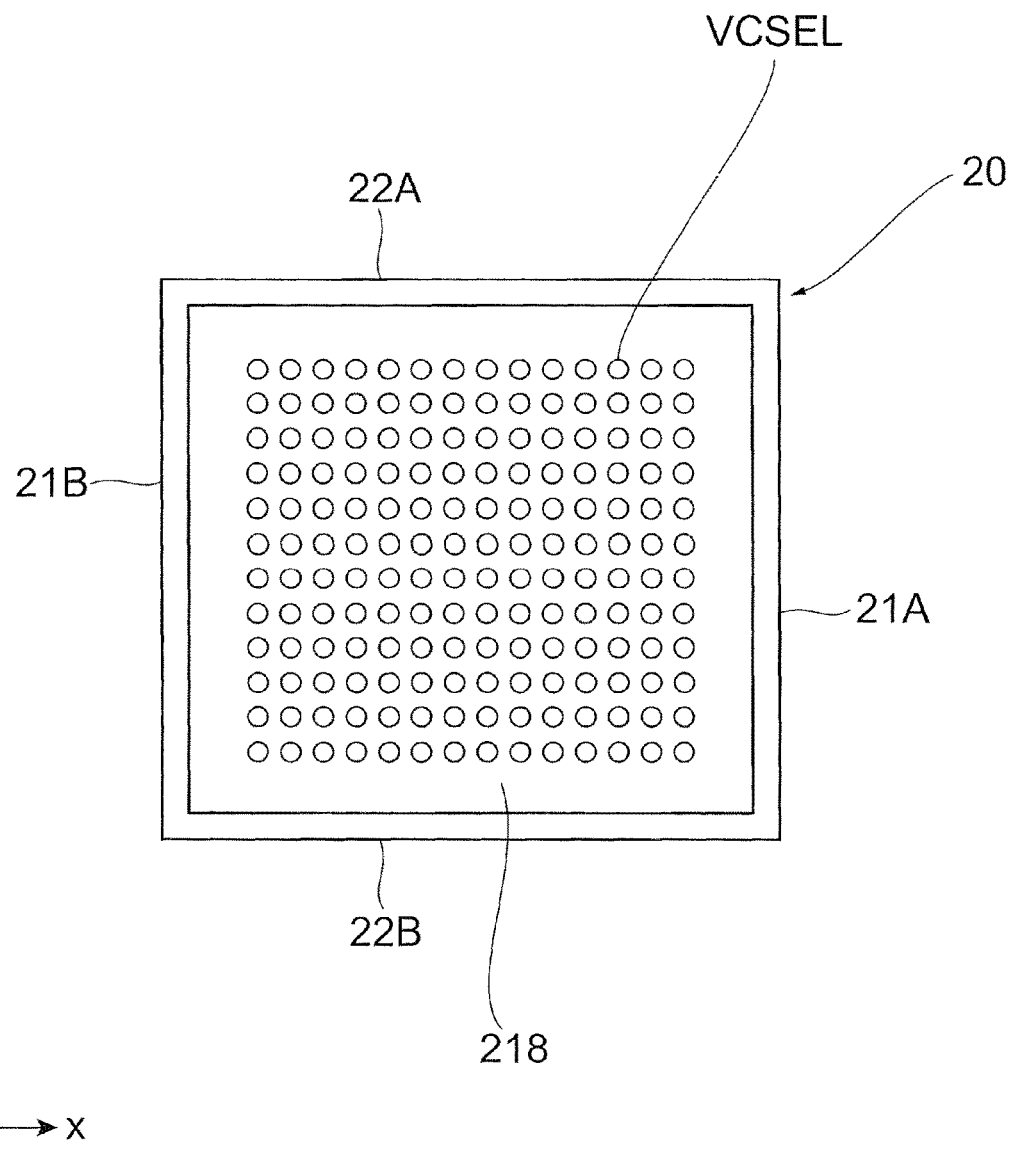
FIG. 3 is a plan view showing a light-emitting element array.

FIG. 3 is a plan view showing the light-emitting element array 20. The light-emitting element array 20 includes plural VCSELs arranged in a two-dimensional array. A right direction of the paper is defined as an x direction, an upper direction of the paper is defined as a y direction. A direction orthogonal to the x direction and the y direction in a counterclockwise manner is defined as a z direction. The x, y, and z directions are the same in the drawings. A front surface refers to a surface at a +z direction side, and a back surface refers to a surface at a −z direction side. The same applies to the other cases.

The VCSEL is a light-emitting element in which an active region serving as a light-emitting region is provided between a lower multilayer film reflector and an upper multilayer film reflector that are stacked on a semiconductor substrate 200 (see FIG. 4 to be described later), and a laser beam is emitted in a direction perpendicular to the semiconductor substrate 200. Therefore, it is easy to form a two-dimensional array. The number of VCSELs provided in the light-emitting element array 20 is, for example, 100 to 1000. The plural VCSELs are connected to one another in parallel and are driven in parallel. The number of VCSELs described above is an example, and may be set according to a measurement distance or a measurement range.

An anode electrode 218 (see FIG. 4 to be described later) shared by the plural VCSELs is provided on a front surface of the light-emitting element array 20. A cathode electrode 214 is provided on a back surface of the light-emitting element array 20 (see FIG. 4 to be described later). That is, the plural VCSELs are connected in parallel. When the plural VCSELs are connected in parallel and are driven, light having a higher intensity is emitted at the same time and are radiated onto the object to be measured as compared with a case where the VCSELs are individually driven.

Here, it is assumed that a planar shape of the light-emitting element array 20 that is a shape in a plan view is a quadrangle. A side surface at a +x direction side indicates a side surface 21A, a side surface at a −x direction side indicates a side surface 21B, a side surface at a +y direction side indicates a side surface 22A, and a side surface at a −y direction side indicates a side surface 22B. The side surface 21A and the side surface 21B face each other. Each of the side surface 22A and the side surface 22B connects the side surface 21A and the side surface 21B, and the side surface 22A and the side surface 22B face each other. Here, the side surface 21A is an example of the first side surface, the side surface 21B is an example of the second side surface, the side surface 22A is an example of the third side surface, and the side surface 22B is an example of the fourth side surface.

(Structure of VCSEL)

Figure 4:
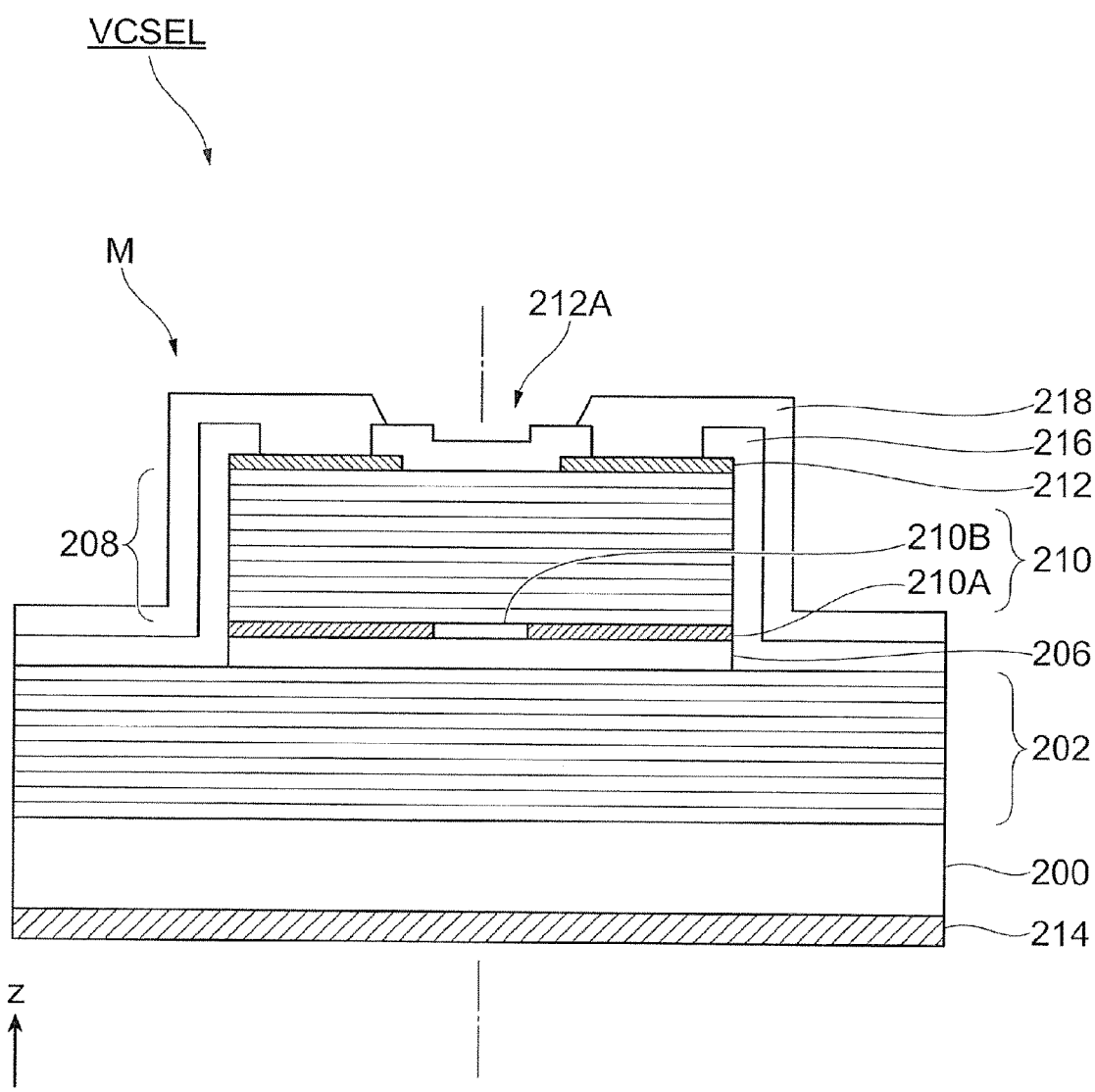
FIG. 4 is a diagram showing a cross-sectional structure of one VCSEL in the light-emitting element array.

FIG. 4 is a diagram showing a cross-sectional structure of one VCSEL in the light-emitting element array 20. The VCSEL is a VCSEL having a λ cavity structure. An upper direction of the paper is defined as a z direction.

The VCSEL is implemented by sequentially stacking, on the semiconductor substrate 200 such as an n type GaAs substrate, an n type lower distributed Bragg reflector (DBR) 202 in which AlGaAs layers having different Al compositions are alternately stacked, an active region 206 including a quantum well layer that is interposed between an upper spacer layer and a lower spacer layer, and a p type upper distributed Bragg reflector 208 in which AlGaAs layers having different Al compositions are alternately stacked. Hereinafter, the distributed Bragg reflector is referred to as a DBR.

The n type lower DBR 202 is a stacked body in which a $Al_{0.9}Ga_{0.1}As$ layer and a GaAs layer are paired, and a thickness of each layer is $\lambda/4n_r$ (in which $\lambda$ is an oscillation wavelength and $n_r$ is a refractive index of a medium), and these layers are alternately stacked in 40 cycles. A carrier concentration after doping with silicon that is an n type impurity is, for example, $3 \times 10^{18}$ cm$^{-3}$.

The active region 206 is formed by stacking a lower spacer layer, a quantum well active layer, and an upper spacer layer. For example, the lower spacer layer is an undoped $Al_{0.6}Ga_{0.4}As$ layer, the quantum well active layer is an undoped InGaAs quantum well layer and an undoped GaAs barrier layer, and the upper spacer layer is an undoped $Al_{0.6}Ga_{0.4}As$ layer.

The p type upper DBR 208 is a stacked body in which a p type $Al_{0.9}Ga_{0.1}As$ layer and a GaAs layer are paired, a thickness of each layer is $\lambda/4n_r$, and these layers are alternately stacked in 29 cycles. A carrier concentration after doping with carbon that is a p type impurity is, for example, $3 \times 10^{18}$ cm$^{-3}$. A contact layer formed of p type GaAs may be formed on an uppermost layer of the upper DBR 208, and a current confinement layer 210 formed of p type AlAs may be formed on a lowermost layer of the upper DBR 208 or inside the upper DBR 208.

A cylindrical mesa M is formed on the semiconductor substrate 200 by etching stacked semiconductor layers from the upper DBR 208 to the lower DBR 202. Accordingly, the current confinement layer 210 is exposed at a side surface of the mesa M. An oxidized region 210A oxidized from the side surface of the mesa M and a conductive region 210B surrounded by the oxidized region 210A are formed in the current confinement layer 210 by an oxidation step. In the oxidation step, an AlAs layer has a higher oxidation rate than an AlGaAs layer, and the oxidized region 210A is oxidized from the side surface of the mesa M toward an inner side at a substantially constant rate, so that a planar shape of the conductive region 210B is a shape that reflects an outer shape of the mesa M, that is, a circular shape, and a center of the conductive region 210B substantially coincides with an axial direction (dashed-dotted line) of the mesa M. The mesa M has a columnar structure in the present exemplary embodiment.

An annular p side electrode 212 that is formed of metal and in which Ti/Au or the like is stacked is formed on an uppermost layer of the mesa M. The p side electrode 212 is in ohmic contact with a contact layer of the upper DBR 208. An inner inside of the annular p side electrode 212 serves as a light emission port 212A through which a laser beam is emitted to an outer side. That is, in the VCSEL, light is emitted in a direction perpendicular to the semiconductor substrate 200, and the axial direction of the mesa M serves as an optical axis. Further, the cathode electrode 214 is formed on the back surface of the semiconductor substrate 200 as an n side electrode. A front surface of the upper DBR 208 inside the p side electrode 212 is a light-emitting surface. That is, the optical axial direction of the VCSEL is a light emitting direction.

An insulating layer 216 is provided in a manner of covering a front surface of the mesa M except for a portion of the p side electrode 212 to which an anode electrode (the anode electrode 218 to be described later) is connected and the light emission port 212A. The anode electrode 218 is provided to be in ohmic contact with the p side electrode 212 except for the light emission port 212A. The anode electrode 218 is shared by the plural VCSELs. That is, the p side electrodes 212 in the plural VCSELs provided in the light-emitting element array 20 are connected in parallel by the anode electrode 218. The anode electrode 218 is an example the an upper surface electrode of the light-emitting element array.

The VCSEL may oscillate in a single transverse mode or in a multiple transverse mode. For example, an optical output of one VCSEL is 4 mW to 8 mW. Therefore, for example, when the light-emitting element array 20 includes 500 VCSELs, an optical output of the light-emitting element array 20 is 2 W to 4 W. In such a light-emitting element array 20 having a large output, heat generated from the light-emitting element array 20 is large.

(Configuration of Light Diffusing Member 30)

Figure 5A:
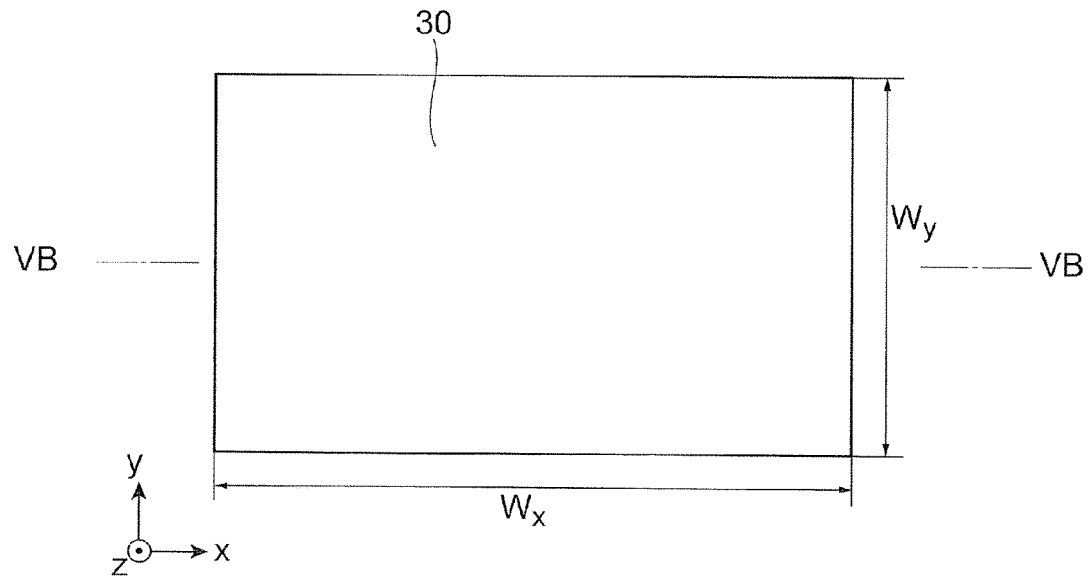
Figure 5B:
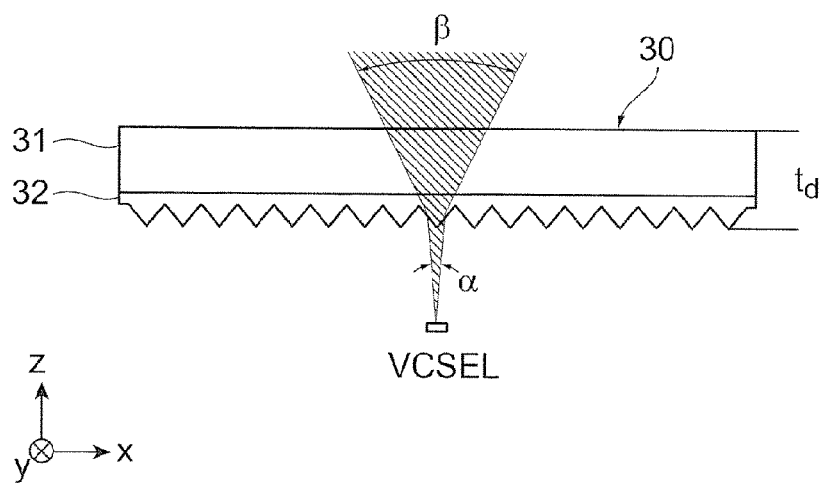

FIGS. 5(a) and 5(b) are diagrams showing an example of the light diffusing member 30. FIG. 5(a) is a plan view and FIG. 5(b) is a cross-sectional view taken along a line VB-VB in FIG. 5(a). In FIG. 5(a), a right direction of the paper is defined as the x direction, and an upper direction of the paper is defined as the y direction. A direction orthogonal to the x direction and the y direction in a counterclockwise manner is defined as the z direction. In FIG. 5(b), a right direction of the paper is defined as the x direction, and an upper direction of the paper is defined as the z direction.

As shown in FIG. 5(b), the light diffusing member 30 includes a resin layer 32 formed with unevenness for diffusing light onto a back surface of a flat glass base member 31 of which two surfaces are parallel to each other. The light diffusing member 30 further expands a spread angle of light incident from the VCSEL of the light-emitting element array 20 and emits the light. That is, the unevenness formed in the resin layer 32 of the light diffusing member 30 refracts or scatters light to increase a spread angle $\alpha$ of incident light to a larger spread angle $\beta$ of emitted light. That is, as shown in FIGS. 5(a) and 5(b) the spread angle $\beta$ of light that is transmitted through the light diffusing member 30 and is emitted from the light diffusing member 30 is larger than the spread angle $\alpha$ of the light emitted from the VCSEL ($\alpha<\beta$). Therefore, an area of an irradiation surface irradiated with the light emitted from the light-emitting element array 20 in a case where the light diffusing member 30 is used is larger than a case where the light diffusing member 30 is not used. In addition, a light density on the irradiation surface is reduced. The light density refers to radiance per unit area, and the spread angles $\alpha$ and $\beta$ are full widths at half maximum (FWHM).

A planar shape of the light diffusing member 30 is, for example, a quadrangle. A width $W_x$ of the light diffusing member 30 in the x direction and a vertical width $W_y$ of the light diffusing member 30 in the y direction is 1 mm to 10 mm, and a thickness $t_d$ of the light diffusing member 30 in the z direction is 0.1 mm to 1 mm. When the light diffusing member 30 has a size and a shape as described above, a light diffusing member suitable for face authentication of a portable information processing terminal or measurement at a relatively short distance of about several meters is provided.

The planar shape of the light diffusing member 30 may be other shapes such as a polygon or a circle.

(Circuit that Drives Light Emitting Element Array 20)

When the light-emitting element array 20 is driven at a higher speed, low-side driving may be performed. The low-side driving refers to a configuration in which a drive element such as a MOS transistor is positioned at a downstream side of a current path relative to a drive target such as a VCSEL. Conversely, a configuration in which a drive element is positioned at an upstream side is referred to as high-side driving.

Figure 6:
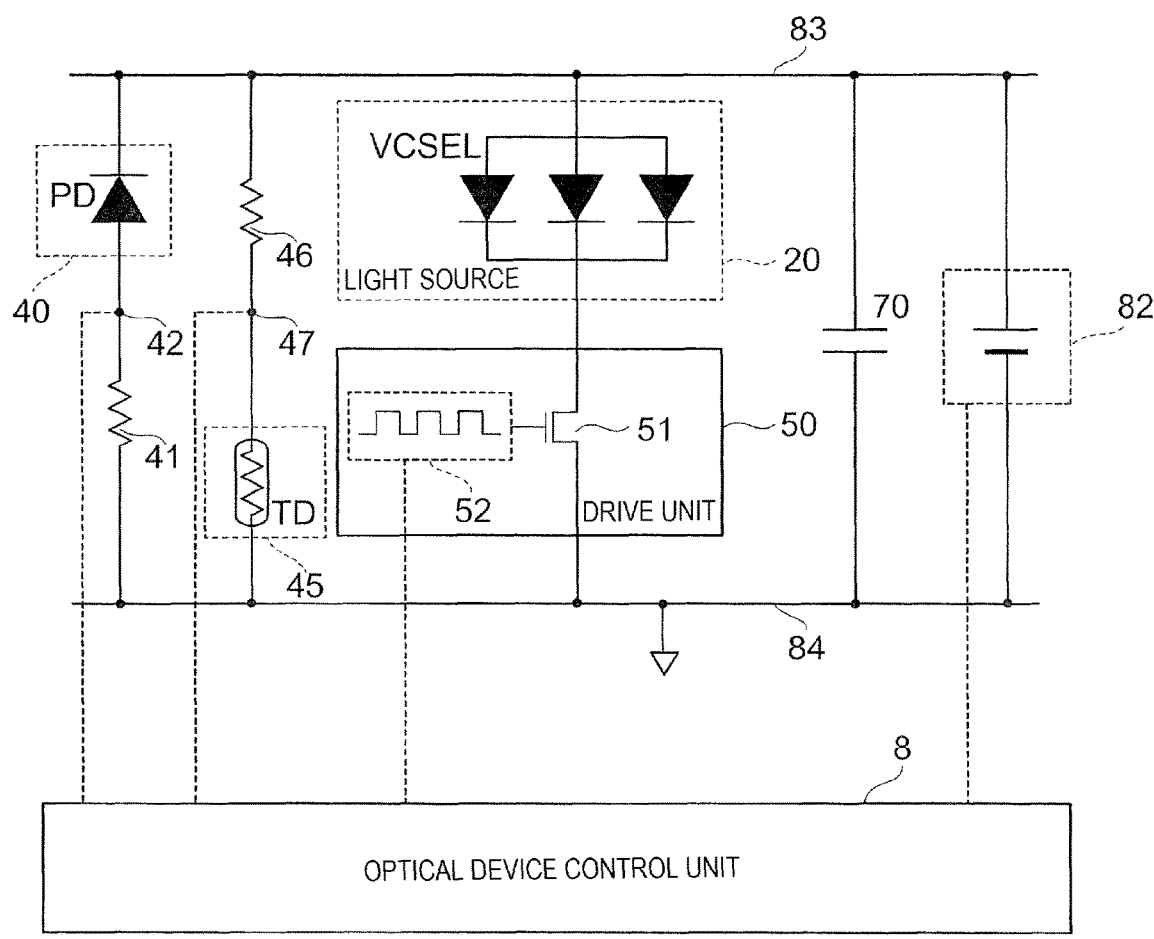
FIG. 6 is a diagram showing an example of an equivalent circuit that drives the light-emitting element array by low-side driving.

FIG. 6 is a diagram showing an example of an equivalent circuit that drives the light-emitting element array 20 by low-side driving. FIG. 6 shows a VCSEL of the light-emitting element array 20, the drive unit 50, the capacitor 70, a power source 82, the PD 40, a light amount detection resistor element 41 that detects a current flowing through the PD 40, the TD 45, and a temperature detection resistor element 46 that detects a current flowing through the TD 45. The capacitor 70 is connected in parallel to the power source 82.

The power source 82 is provided in the optical device control unit 8 shown in FIG. 2. The power source 82 generates a direct current voltage having a positive side as a power source potential and a negative side as a ground potential. The power source potential is supplied to a power source line 83, and the ground potential is supplied to a ground line 84.

As described above, the light-emitting element array 20 is configured by connecting plural VCSELs in parallel. The anode electrode 218 (see FIG. 4) of the VCSEL is connected to the power source line 83.

The drive unit 50 includes an n channel MOS transistor 51 and a signal generation circuit 52 that turns on and turns off the MOS transistor 51. A drain of the MOS transistor 51 is connected to the cathode electrode 214 (see FIG. 4) of the VCSEL. A source of the MOS transistor 51 is connected to the ground line 84. A gate of the MOS transistor 51 is connected to the signal generation circuit 52. That is, the VCSEL and the MOS transistor 51 of the drive unit 50 are connected in series between the power source line 83 and the ground line 84. The signal generation circuit 52 generates an "H level" signal for turning on the MOS transistor 51 and an "L level" signal for turning off the MOS transistor 51 under the control of the optical device control unit 8.

The capacitor 70 has one terminal connected to the power source line 83 and the other terminal connected to the ground line 84. That is, the capacitor 70 is connected in parallel to the power source 82. When there are plural capacitors 70, the plural capacitors 70 are connected in parallel. The capacitor 70 is an electrolytic capacitor, a ceramic capacitor, and the like.

A cathode electrode of the PD 40 is connected to the power source line 83, and an anode electrode of the PD 40 is connected to one terminal of the light amount detection resistor element 41. The other terminal of the light amount detection resistor element 41 is connected to the ground line 84. That is, the PD 40 and the light amount detection resistor element 41 are connected in series between the power source line 83 and the ground line 84. An output terminal 42 that is a connection point between the PD 40 and the light amount detection resistor element 41 is connected to the optical device control unit 8.

One terminal of the temperature detection resistor element 46 is connected to the power source line 83, and the other terminal of the temperature detection resistor element 46 is connected to one electrode of the TD 45. The other electrode of the TD 45 is connected to the ground line 84. That is, the temperature detection resistor element 46 and the TD 45 are connected in series between the power source line 83 and the ground line 84. An output terminal 47 that is a connection point between the temperature detection resistor element 46 and the TD 45 is connected to the optical device control unit 8.

Next, a method of driving the light-emitting element array 20 that is low-side driving will be described.

First, it is assumed that a signal generated by the signal generation circuit 52 in the drive unit 50 is at an "L level". In this case, the MOS transistor 51 is turned off. That is, no current flows between the source and the drain of the MOS transistor 51. Therefore, no current flows through the VCSEL connected in series with MOS transistor 51. The VCSEL does not emit light.

At this time, the capacitor 70 is charged by the power source 82. That is, one terminal of the capacitor 70 connected to the power source line 83 is a power source potential, and the other terminal of the capacitor 70 connected to the ground line 84 is a ground potential. The capacitor 70 accumulates electric charges determined by a capacitance, a power source voltage (=power source potential−ground potential), and time.

Next, when a signal generated by the signal generation circuit 52 in the drive unit 50 is at an "H level", the MOS transistor 51 shifts from an OFF state to an ON state. Then, the electric charges accumulated in the capacitor 70 are discharged, and a current flows through the MOS transistor 51 and the VCSEL that are connected in series, so that the VCSEL emits light.

When a signal generated by the signal generation circuit 52 in the drive unit 50 is at an "L level", the MOS transistor 51 shifts from an ON state to an OFF state. Accordingly, the VCSEL stops emitting light. Then, the power source 82 resumes the accumulation of electric charges in the capacitor 70.

As described above, each time when the signal output from the signal generation circuit 52 shifts between the "L level" and the "H level", the MOS transistor 51 is repeatedly turned on and turned off, and emission and non-emission that is a state in which the VCSEL stops emitting light are repeated. That is, a light pulse is emitted from the VCSEL. Repetition of ON and OFF of the MOS transistor 51 may be referred to as switching. As shown in FIG. 6, the equivalent circuit includes the light-emitting element array 20, the MOS transistor 51, the capacitor 70, and the like, and a current path to the light-emitting element array 20 is referred to as a circuit or a circuit that drives the light-emitting element array 20.

Electric charges (a current) may be directly supplied from the power source 82 to the VCSEL without providing the capacitor 70. Alternatively, these electric charges are accumulated in the capacitor 70, and the accumulated charges are discharged when the MOS transistor 51 is switched from an OFF state to an ON state to rapidly supply a current to the VCSEL, so that a rise time of light emission of the VCSEL is reduced.

The PD 40 is connected in a reverse direction between the power source line 83 and the ground line 84 via the light amount detection resistor element 41. Therefore, no current flows in a state in which light is not radiated. As described above, when the PD 40 receives a part of light reflected by the light diffusing member 30 among the light emitted from the VCSEL, a current corresponding to a received light amount flows through the PD 40. Therefore, the current flowing through the PD 40 is measured as a voltage of the output terminal 42, and a light intensity of the light-emitting element array 20 is detected. Therefore, the optical device control unit 8 controls the light intensity of the light-emitting element array 20 to be a predetermined light intensity according to the received light amount of the PD 40. For example, when the light intensity of the light-emitting element array 20 is lower than the predetermined light intensity, the optical device control unit 8 increases the power source potential of the power source 82 to increase an amount of electric charges accumulated in the capacitor 70, thereby increasing a current flowing through the VCSEL. On the other hand, when the light intensity of the light-emitting element array 20 is higher than the predetermined light intensity, the power source potential of the power source 82 is lowered to reduce an amount of electric charges accumulated in the capacitor 70, thereby reducing a current flowing through the VCSEL. In this manner, the light intensity of the light-emitting element array 20 is controlled.

When the received light amount of the PD 40 is extremely low, the light diffusing member 30 may be removed or damaged, and the light emitted from the light-emitting element array 20 may be directly radiated to the outside. In such a case, the light intensity of the light-emitting element array 20 is reduced by the optical device control unit 8. For example, emission of light from the light-emitting element array 20, that is, radiation of light onto an object to be measured, is stopped.

As described above, the PD 40 is provided to detect the light intensity of the light-emitting element array 20. Therefore, when the PD 40 is disposed far from the light-emitting element array 20, a received light amount is reduced, and detection sensitivity of the light intensity of the light-emitting element array 20 is reduced. Therefore, the PD 40 may be disposed in the vicinity of the light-emitting element array 20.

The TD 45 is connected in series with the temperature detection resistor element 46 between the power source line 83 and the ground line 84. Therefore, the output terminal 47 has a voltage obtained by dividing the power source voltage (=power source potential−ground potential) by the temperature detection resistor element 46 and the TD 45. When the TD 45 is, for example, a negative temperature coefficient (NTC) thermistor, a resistance value of the TD 45 is reduced along with an increase in the temperature of the base member 100 as described above. In this case, a voltage of the output terminal 47 is reduced along with an increase in the temperature of the base member 100. The optical device control unit 8 detects the temperature of the base member 100, that is, a temperature of the light-emitting element array 20, based on the voltage of the output terminal 47. When the temperature of the light-emitting element array 20 exceeds a predetermined allowable temperature, an operation of the light-emitting element array 20 may be unstable or broken. Therefore, when the optical device control unit 8 detects that the temperature of the light-emitting element array 20 exceeds the allowable temperature based on the voltage of the output terminal 47, the optical device control unit 8 controls the drive unit 50 to reduce a current flowing through the light-emitting element array 20 or cut off the current flowing through the light-emitting element array 20. In this manner, overheating of the light-emitting element array 20 is prevented.

As described above, the TD 45 is provided to detect the temperature of the light-emitting element array 20. Therefore, when the TD 45 is disposed far from the light-emitting element array 20, a change in the temperature of the TD 45 is reduced, and detection sensitivity of the temperature of the light-emitting element array 20 is reduced. Therefore, the TD 45 may be disposed in the vicinity of the light-emitting element array 20.

That is, the PD 40 and the TD 45 are examples of circuit elements disposed close to the light-emitting element array 20.

(Light-Emitting Device 4)

Next, the light-emitting device 4 will be described in detail.

FIGS. 7(*a*) to 7(*c*) are diagrams showing the light-emitting device 4 to which the present exemplary embodiment is applied. FIG. 7(*a*) is a plan view, FIG. 7(*b*) is a cross-sectional view taken along a line VIIB-VIIB in FIG. 7(*a*), and FIG. 7(*c*) are cross-sectional views taken along a line VIIC-VIIC in FIG. 7(*a*). In FIG. 7(*a*), a right direction of the paper is defined as the x direction, and an upper direction of the paper is defined as the y direction. A direction orthogonal to the x direction and the y direction in a counterclockwise manner is defined as the z direction. In FIGS. 7(*b*) and 7(*c*), a right direction of the paper is defined as the x direction, and an upper direction of the paper is defined as the z direction. The same applies to the same drawings to be described below.

As shown in FIGS. 7(*b*) and 7(*c*), the base member 100 and the drive unit 50 are provided on the wiring substrate 10 in the light-emitting device 4. The light-emitting element array 20, the PD 40, the TD 45, and the holding unit 60 are provided on the base member 100. The light diffusing member 30 is provided on the holding unit 60. As shown in FIGS. 7(*a*) and 7(*c*), the light-emitting element array 20, the PD 40, and the TD 45 are covered by the light diffusing member 30. Therefore, the PD 40 receives a part of light reflected by the back surface of the light diffusing member 30 among the light emitted from the light-emitting element array 20. The holding unit 60 may be provided on the wiring substrate 10.

As shown in FIG. 7(*a*), the PD 40, the light-emitting element array 20, the TD 45, and the drive unit 50 are linearly arranged in the x direction in the light-emitting device 4. Here, it is assumed that an area occupied by the PD 40 on the base member 100 is larger than an area occupied by the TD 45 on the base member 100. An area occupied on the base member 100 is referred to as an occupation area in the following description. That is, in the light-emitting device 4, the PD 40 and the TD 45 are disposed close to the light-emitting element array 20, and the TD 45 having a small occupation area is disposed at a side of the light-emitting element array 20 close to the drive unit 50, and the PD 40 having a large occupation area is disposed at a side of the light-emitting element array 20 far from the drive unit 50.

With such an arrangement, a distance D1 from an end portion of the light-emitting element array 20 at the drive unit 50 side to the drive unit 50 shown in FIG. 7(*a*) is shorter than a distance D2 in a comparative example to be described later. As will be described later, a light-emitting element array cathode wiring pattern 12 that connects the cathode electrode 214 of the light-emitting element array 20 and the drain (see FIG. 6) of the MOS transistor 51 of the drive unit 50 is provided linearly in the x direction. Therefore, when the distance D1 from the end portion of the light-emitting element array 20 at the drive unit 50 side to the drive unit 50 is short, the light-emitting element array cathode wiring pattern 12 is short, and inductance of the circuit that drives the light-emitting element array 20 is small.

This will be described in detail below.

The wiring substrate 10 is, for example, a three-layer multilayer substrate. That is, the wiring substrate 10 includes a first conductive layer, a second conductive layer, and a third conductive layer from a side where the base member, the drive unit 50, and the like are mounted. Further, an insulating layer is provided between the first conductive layer and the second conductive layer, and between the second conductive layer and the third conductive layer. For example, the third conductive layer is the power source line 83, and the second conductive layer is the ground line 84. Then, light-emitting element array anode wiring patterns 11-1 and 11-2 and the light-emitting element array cathode wiring pattern 12 that constitute a part of a current path to the light-emitting element array 20, a PD anode wiring pattern 13 and a PD cathode wiring pattern 14 that constitute a current path to the PD 40, and a TD anode wiring pattern 15 TD and a TD cathode wiring pattern 16 (see FIGS. 8(*a*) to 8(*c*) to be described later) that constitute a part of a current path to the TD 45 are formed by the first conductive layer. Further, wiring patterns to which circuit components such as the capacitor 70, the resistor element 6, and the capacitor 7 are connected are formed by the first conductive layer, and these wiring patterns are not shown. In this manner, the wiring substrate 10 is a multilayer substrate, the power source line 83 is the third conductive layer, and the ground line 84 is the second conductive layer, so that a fluctuation in the power source potential and the ground potential is prevented. A path through which a current flows, such as the light-emitting element array anode wiring pattern 11-1 and 11-2, the light-emitting element array cathode wiring pattern 12, the PD anode wiring pattern 13, the PD cathode wiring pattern 14, the TD anode wiring pattern 15, and the TD cathode wiring pattern 16, is referred to as a wiring pattern. The wiring pattern formed of the first conductive layer is electrically connected to the second conductive layer or the third conductive layer via a via. For example, the via is a conductive portion formed by embedding a conductive material in a hole provided in a manner of passing through the wiring substrate 10 in a thickness direction.

The first conductive layer, the second conductive layer, and the third conductive layer are formed of a metal such as copper (Cu) or silver (Ag) or a conductive material such as a conductive paste containing these metals. The insulating layer is formed of epoxy resin, ceramics, or the like.

The base member 100 is formed of an electrically insulating material. Since the light-emitting element array 20 is provided on the base member 100, the base member 100 may be formed of a heat dissipation member that has an electrically insulating property and has a higher thermal conductivity than the wiring substrate 10. Examples of the heat dissipation member that has an electrically insulating property include ceramics such as silicon nitride and aluminum nitride. When the base member 100 is a heat dissipation member, heat generated by the light-emitting element array 20 is easily transferred to the holding unit 60 and the light diffusing member 30 via the base member 100 and is dissipated, and heat dissipation efficiency is improved.

Light-emitting element array anode wiring patterns 111-1F and 111-2F and a light-emitting element array cathode wiring pattern 112F that constitute a part of a current path to the light-emitting element array 20, a PD anode wiring pattern 113F and a PD cathode wiring pattern 114F that constitute a part of a current path to the PD 40, a TD anode wiring pattern 115F and a TD cathode wiring pattern 116F that constitute a part of a current path to the TD 45 are provided on a front surface of the base member 100.

Figure 7A:
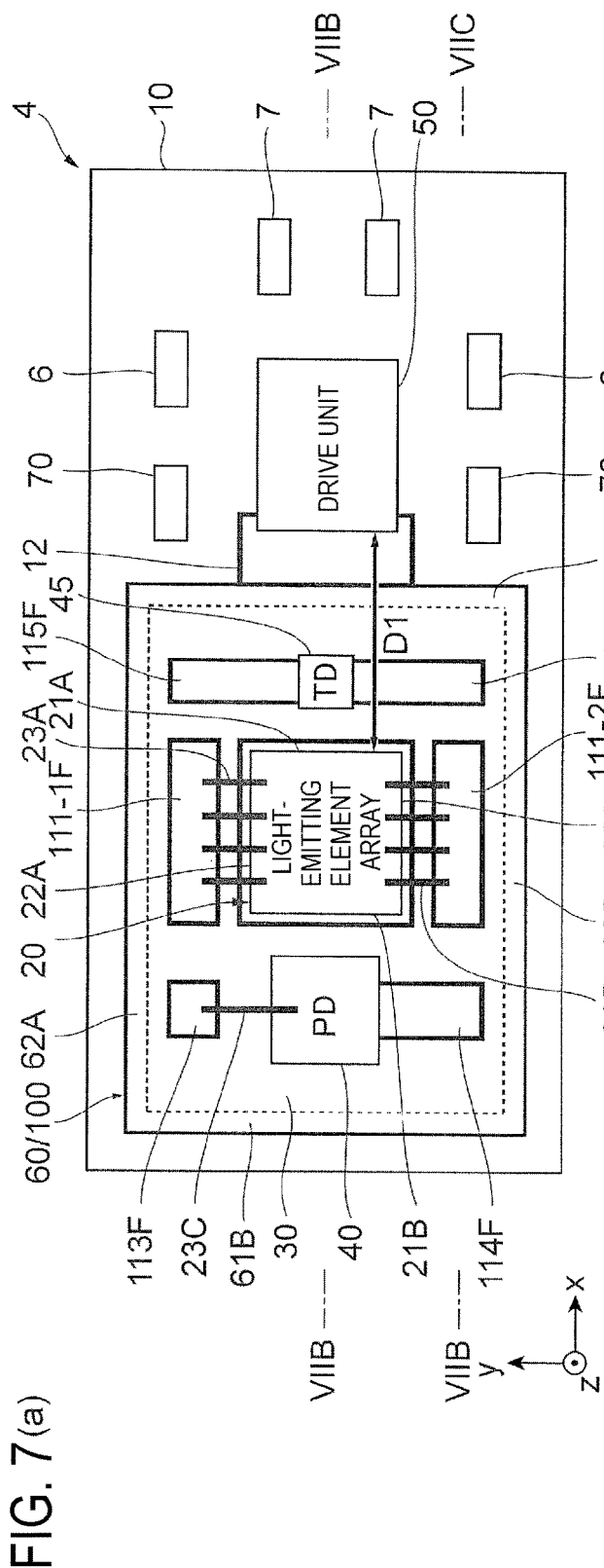
FIGS. 7(a) to 7(c) are diagrams showing a light-emitting device to which the present exemplary embodiment is applied.
Figure 7B:
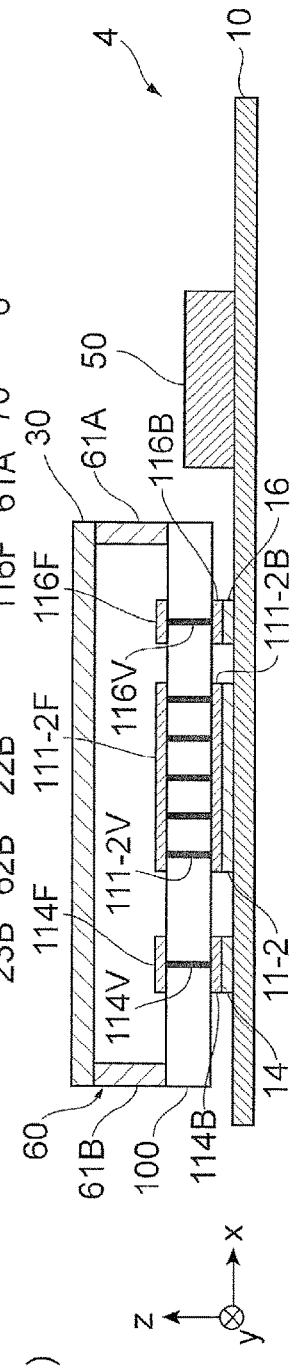

Light-emitting element array anode wiring patterns 111-1B (see FIG. 8(*c*) to be described later) and 111-2B and a light-emitting element array cathode wiring pattern 112B that constitute a part of a current path to the light-emitting element array 20, a PD anode wiring pattern 113B (see FIG. 8(*b*) to be described later) and a PD cathode wiring pattern 114B that constitute a part of a current path to the PD 40, a TD anode wiring pattern 115B (see FIG. 8(*c*) to be described later) and a TD cathode wiring pattern 116B that constitute a part of a current path to the TD 45 are provided on a back surface of the base member 100. The wiring patterns of the same number are connected to each other via a via on the front surface and the back surface of the base member 100. For example, as shown in FIG. 7(*b*), the light-emitting element array anode wiring pattern 111-2F provided on the front surface and the light-emitting element array cathode wiring pattern 111-2B provided on the back surface are connected via a via 111-2V. The via is denoted by adding "V" to the reference number of the wiring pattern. Here, the via is, for example, a conductive portion formed by embedding a conductive material in a hole that is provided in a manner of passing through the base member 100, and the via electrically connects the wiring pattern on the front surface and the wiring pattern on the back surface. The inductance of the circuit is reduced by connecting the wiring patterns using plural vias.

Then, the light-emitting element array cathode wiring pattern 112F of the base member 100 and the cathode electrode 214 (see FIG. 4) of the light-emitting element array 20 are connected by a conductive adhesive or the like. The light-emitting element array anode wiring pattern 111-1F of the base member 100 and the anode electrode 218 (see FIG. 4) of the light-emitting element array 20 are connected by a bonding wire 23A at the side surface 22A side of the light-emitting element array 20, and the light-emitting element array anode wiring pattern 111-2F of the base member 100 and the anode electrode 218 (see FIG. 4) of the light-emitting element array 20 are connected by a bonding wire 23B at the side surface 22B side of the light-emitting element array 20. Here, the light-emitting element array anode wiring pattern 111-1F is provided at the side surface 22A side of the light-emitting element array 20, and the light-emitting element array anode wiring pattern 111-2F is provided at the side surface 22B side of the light-emitting element array 20. The light-emitting element array anode wiring patterns may not be provided at the side surface 21A side and the side surface 21B side of the light-emitting element array 20. In this manner, the bonding wires that connect the anode electrode 218 and the light-emitting element array anode wiring patterns are not provided at the side surface 21A side and the side surface 21B side of the light-emitting element array 20. Therefore, the PD 40 and the TD 45 that are examples of circuit elements desired to be disposed close to the light-emitting element array 20 are arranged close to the light-emitting element array 20. Here, the bonding wires (the bonding wires 23A and 23B) are examples of a wiring member extending from an upper surface electrode of the light-emitting element array 20 toward an outer side of the light-emitting element array 20.

The light-emitting element array anode wiring pattern 111-1F provided on the front surface of the base member 100 is connected to the light-emitting element array anode wiring pattern 11-1 provided on the wiring substrate 10 via the light-emitting element array anode wiring pattern 111-1B provided on the back surface. Similarly, the light-emitting element array anode wiring pattern 111-2F provided on the front surface of the base member 100 is connected to the light-emitting element array anode wiring pattern 11-2 provided on the wiring substrate 10 via the light-emitting element array anode wiring pattern 111-2B provided on the back surface. The light-emitting element array anode wiring patterns 11-1 and 11-2 are connected to one terminal of the capacitor 70. The capacitor 70 may be provided for each of the light-emitting element array anode wiring patterns 11-1 and 11-2.

In the PD 40, the cathode electrode of the PD 40 is bonded to the PD cathode wiring pattern 114F of the base member 100 by a conductive adhesive, and the anode electrode of the PD 40 is connected to the PD anode wiring pattern 113F of the base member 100 by a bonding wire 23C.

In the TD 45, one terminal (in a case where the TD 45 has polarity, a terminal at a positive side) is connected to the TD anode wiring pattern 115F of the base member 100, and the other terminal (in a case where the TD 45 has polarity, the terminal at a negative side) is connected to the TD cathode wiring pattern 116F of the base member 100 by a conductive adhesive or solder.

The light-emitting element array anode wiring patterns 11-1 and 11-2 and the light-emitting element array cathode wiring pattern 12 provided on the wiring substrate 10 are respectively connected to the light-emitting element array anode wiring patterns 111-1B and 111-2B and the light-emitting element array cathode wiring pattern 112B provided on the back surface of the base member 100. Similarly, the PD anode wiring pattern 13 and the PD cathode wiring pattern 14 provided on the wiring substrate 10 are respectively connected to the PD anode wiring pattern 113B and the PD cathode wiring pattern 114B provided on the back surface of the base member 100. The TD anode wiring pattern 15 (see FIG. 8(*a*) to be described later) and the TD cathode wiring pattern 16 provided on the wiring substrate 10 are respectively connected to the TD anode wiring pattern 115B (see FIG. 8(*c*) to be described later) and the TD cathode wiring pattern 116B provided on the back surface of the base member 100. The wiring patterns of the wiring substrate 10 and the wiring patterns of the base member 100 are connected by a conductive adhesive or the like.

As shown in FIG. 7(*b*), in a cross-sectional view taken along the line VIIB-VIIB shifted to a −y direction side from a center in the y direction, the light-emitting element array anode wiring pattern 11-2 of the wiring substrate 10 and the light-emitting element array anode wiring pattern 111-2B provided on the back surface of the base member 100 are connected to each other. The light-emitting element array anode wiring pattern 111-2B of the base member 100 is connected to the light-emitting element array anode wiring pattern 111-2F provided on the front surface of the base member 100 via the via 111-2V. The light-emitting element array anode wiring pattern 111-2F of the base member 100 is connected to the anode electrode 218 (see FIG. 4) of the light-emitting element array 20 via the bonding wire 23B.

Similarly, the PD cathode wiring pattern 14 of the wiring substrate 10 is connected to the PD cathode wiring pattern 114B provided on the back surface of the base member 100. The PD cathode wiring pattern 114B of the base member 100 is connected to the PD cathode wiring pattern 114F provided on the front surface of the base member 100 via a via 114V. The PD cathode wiring pattern 114F of the base member 100 is connected to the cathode of the PD 40.

Further, the TD cathode wiring pattern 16 of the wiring substrate 10 is connected to the TD cathode wiring pattern 116B provided on the back surface of the base member 100. The TD cathode wiring pattern 116B of the base member 100 is connected to the TD cathode wiring pattern 116F provided on the front surface of the base member 100 via a via 116V. The TD cathode wiring pattern 116F of the base member 100 is connected to the cathode of the TD 45.

That is, in the cross section taken along the line VIIB-VIIB, the light-emitting element array anode wiring pattern 11-2 of the wiring substrate 10, the light-emitting element array anode wiring pattern 111-2B provided on the back surface of the base member 100, and the light-emitting element array anode wiring pattern 111-2F provided on the front surface of the base member 100 are provided in a manner of facing one another. Similarly, the PD cathode wiring pattern 14 of the wiring substrate 10, the PD cathode wiring pattern 114B provided on the back surface of the base member 100, and the PD cathode wiring pattern 114F provided on the front surface of the base member 100 are provided in a manner of facing one another. Further, the TD cathode wiring pattern 16 of the wiring substrate 10, the TD cathode wiring pattern 116B provided on the back surface of the base member 100, and the TD cathode wiring pattern 116F provided on the front surface of the base member 100 are provided in a manner of facing one another. Although not shown, the light-emitting element array anode wiring pattern 11-1 of the wiring substrate 10, the light-emitting element array anode wiring pattern 111-1B provided on the back surface of the base member 100, and the light-emitting element array anode wiring pattern 111-1F provided on the front surface of the base member 100 are provided in a manner of facing one another.

Figure 7C:
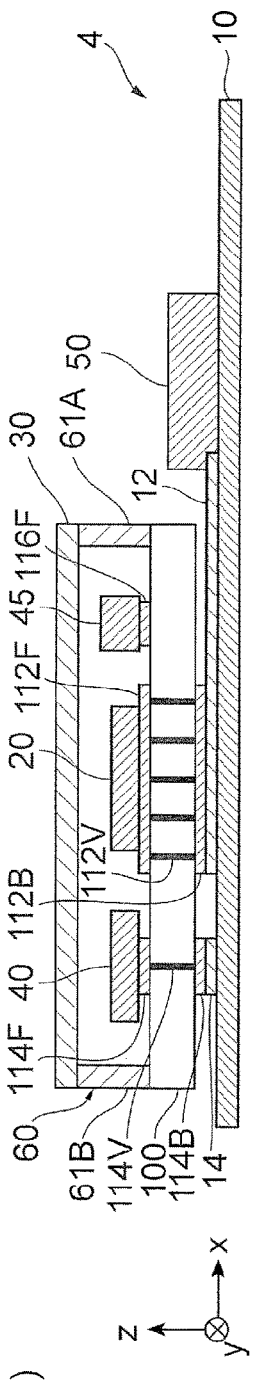
Figure 8:
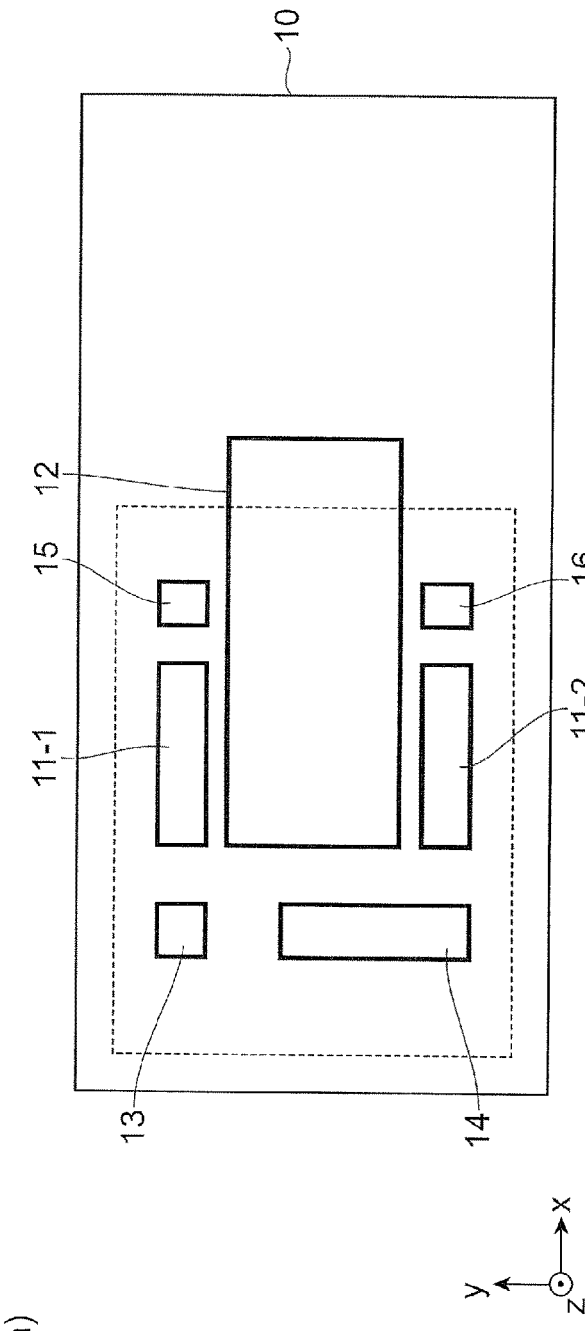
FIGS. 8(a) to 8(c) are diagrams showing wiring patterns provided on a wiring substrate and a base member.
Figure 8:
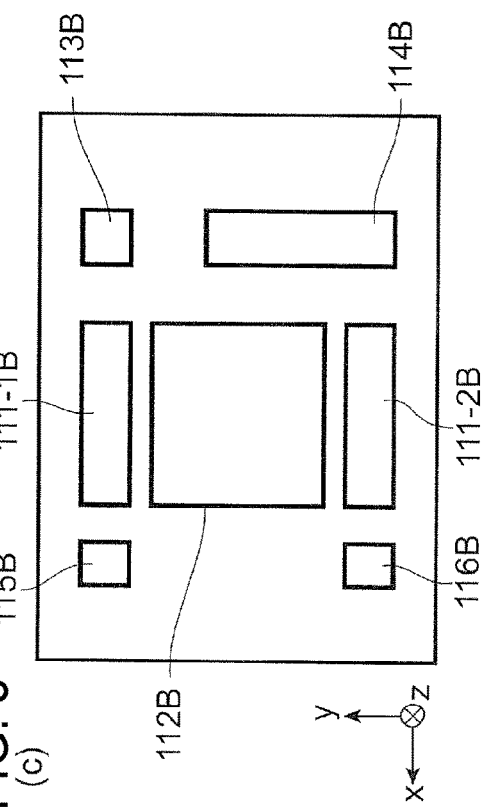
Figure 8:
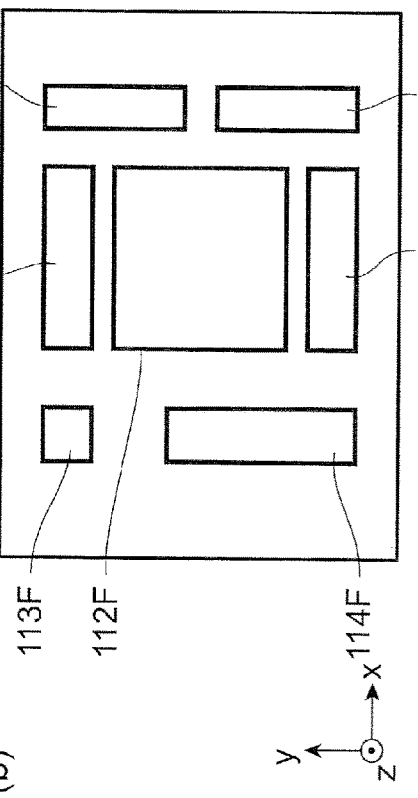

On the other hand, as shown in FIG. 7(c), in the cross-sectional view taken along the line VIIC-VIIC in the center in the y direction, the light-emitting element array cathode wiring pattern 12 of the wiring substrate 10 is provided in a manner of extending from a lower side of the light-emitting element array 20 to the drive unit 50. The light-emitting element array cathode wiring pattern 12 is connected to the light-emitting element array cathode wiring pattern 112B provided on the back surface of the base member 100. The light-emitting element array cathode wiring pattern 112B is connected to the light-emitting element array cathode wiring pattern 112F provided on the front surface of the base member 100 via a via 112V. The light-emitting element array cathode wiring pattern 112F is connected to the cathode electrode 214 of the light-emitting element array 20.

The PD cathode wiring pattern 14 of the wiring substrate 10 and the PD cathode wiring pattern 114B provided on the back surface of the base member 100 are connected to each other. The PD cathode wiring pattern 114B is connected to the PD cathode wiring pattern 114F provided on the front surface of the base member 100 via the via 114V. The PD cathode wiring pattern 114F is connected to the cathode electrode of the PD 40. In the cross-sectional view taken along the line VIIC-VIIC, the PD cathode wiring pattern 14 provided on the wiring substrate 10 and the PD cathode wiring pattern 114B provided on the back surface of the base member 100 may not be provided.

In the cross section taken along the line VIIC-VIIC shown in FIG. 7(c), neither the TD anode wiring pattern 115F nor the TD cathode wiring pattern 116F on the base member 100 is connected to the light-emitting element array cathode wiring pattern 12 provided on the wiring substrate 10.

That is, in the cross section taken along the line VIIC-VIIC, the light-emitting element array cathode wiring pattern 112B provided on the back surface of the base member 100 and the light-emitting element array cathode wiring pattern 112F provided on the front surface of the base member 100 are provided in a manner of facing each other, and the light-emitting element array cathode wiring pattern 12 of the wiring substrate 10 is provided in a manner of extending from a portion facing the light-emitting element array cathode wiring pattern 112B to the drive unit 50. Alternatively, a wiring pattern facing the TD anode wiring pattern 115F or the TD cathode wiring pattern 116F is not provided on the back surface of the base member 100. That is, the TD anode wiring pattern 115F or the TD cathode wiring pattern 116F provided on the base member 100 and the light-emitting element array cathode wiring pattern 12 provided on the wiring substrate 10 three-dimensionally intersect with one another but are not electrically connected to each other. That is, the base member 100 is provided across the light-emitting element array cathode wiring pattern 12. In this manner, the light-emitting element array cathode wiring pattern 12 of the wiring substrate 10 is provided in a manner of extending from the light-emitting element array 20 to the drive unit 50 on the back surface of the base member 100, and the TD 45 is provided in a region on the base member 100 that is a region overlapping the light-emitting element array cathode wiring pattern 12 in a plan view. When the base member 100 is not provided across the light-emitting element array cathode wiring pattern 12 and the base member 100 is provided at one side in a width direction of the light-emitting element array cathode wiring pattern 12, a size of the light-emitting device 4 is increased.

As described above, as shown in FIG. 7(a), in the light-emitting device 4 to which the first exemplary embodiment is applied, the PD 40 and the TD 45 are disposed close to the light-emitting element array 20, and the TD 45 having a smaller occupation area than the PD 40 is disposed between the light-emitting element array 20 and the drive unit 50, so that the distance D1 between the light-emitting element array 20 and the drive unit 50 is reduced, and a wiring pattern (here, the light-emitting element array cathode wiring pattern 12) that connects the light-emitting element array 20 and the drive unit 50 is linearly provided. Accordingly, the wiring pattern (here, the light-emitting element array cathode wiring pattern 12) that connects the light-emitting element array 20 and the drive unit 50 is shortened, and an increase in inductance of the circuit is prevented.

Next, the wiring patterns provided on the wiring substrate 10 and the base member 100 will be described in detail.

FIGS. 8(a) to 8(c) are diagrams showing wiring patterns provided on the wiring substrate 10 and the base member 100. FIG. 8(a) shows a front surface of the wiring substrate 10, FIG. 8(b) shows the front surface of the base member 100, and FIG. 8(c) shows the back surface of the base member 100. FIG. 8(a) shows a wiring pattern formed by the first conductive layer of the wiring substrate 10, and does not show wiring patterns formed by the second conductive layer that is the ground line 84 and the third conductive layer that is the power source line 83. The second conductive layer and the third conductive layer are solid films except for a portion where a via used to connect to the wiring pattern formed by the first conductive layer is provided.

The light-emitting element array anode wiring patterns 11-1 and 11-2 and the light-emitting element array cathode wiring pattern 12 are provided on the front surface of the wiring substrate 10 shown in FIG. 8(a). The light-emitting element array cathode wiring pattern 12 has a quadrangular planar shape. The light-emitting element array anode wiring patterns 11-1 and 11-2 are provided adjacent to the light-emitting element array cathode wiring pattern 12 in the ±y direction. Further, the PD anode wiring pattern 13, the PD cathode wiring pattern 14, the TD anode wiring pattern 15, and the TD cathode wiring pattern 16 are provided on the front surface of the wiring substrate 10. The PD anode wiring pattern 13 and the PD cathode wiring pattern 14 are provided at the −x direction side of the light-emitting element array cathode wiring pattern 12, and the TD anode wiring pattern 15 and the TD cathode wiring pattern 16 are provided in a manner of sandwiching the light-emitting element array cathode wiring pattern 12 in the ±y direction.

The light-emitting element array anode wiring patterns 111-1F and 111-2F and the light-emitting element array cathode wiring pattern 112F are provided on the front surface of the base member 100 shown in FIG. 8(b). The light-emitting element array cathode wiring pattern 112F has a quadrangular planar shape corresponding to the planar shape of the light-emitting element array 20 shown in FIG. 3. The light-emitting element array anode wiring patterns 111-1F and 111-2F are provided adjacent to the light-emitting element array cathode wiring pattern 112F in the ±y direction. Further, the PD anode wiring pattern 113F, the PD cathode wiring pattern 114F, the TD anode wiring pattern 115F, and the TD cathode wiring pattern 116F are provided on the front surface of the base member 100.

The light-emitting element array anode wiring pattern 111-1B connected to the light-emitting element array anode wiring pattern 111-1F via a via 111-1V, the light-emitting element array anode wiring pattern 111-2B connected to the light-emitting element array anode wiring pattern 111-2F via a via 111-2V, the light-emitting element array cathode wiring pattern 112B connected to the light-emitting element array cathode wiring pattern 112F via the via 112V, the PD anode wiring pattern 113B connected to the PD anode wiring pattern 113F via a via 113V, the PD cathode wiring pattern 114B connected to the PD cathode wiring pattern 114F via the via 114V, the TD anode wiring pattern 115B connected to the TD anode wiring pattern 115F via a via 115V, and the TD cathode wiring pattern 116B connected to the TD cathode wiring pattern 116F via the via 116V are provided on the back surface of the base member 100 shown in FIG. 8(c). The wiring patterns on the front surface of the base member 100 shown in FIG. 8(b) and the wiring patterns on the back surface of the base member 100 shown in FIG. 8(c) are mirror-inverted except for the TD anode wiring pattern 115F, the TD cathode wiring pattern 116F, the TD anode wiring pattern 115B, and the TD cathode wiring pattern 116B. That is, the wiring patterns on the front surface and the wiring patterns on the back surface of the base member 100 are provided in a manner of overlapping one another in a plan view. The light-emitting element array cathode wiring pattern 12 is a wiring pattern on the wiring substrate 10 that is connected to the light-emitting element array 20 and extends from the back surface side of the base member 100 toward the drive unit 50.

On the other hand, the TD anode wiring pattern 115F and the TD cathode wiring pattern 116F, the TD anode wiring pattern 115B and the TD cathode wiring pattern 116B are provided such that the TD anode wiring pattern 115F and the TD cathode wiring pattern 116F on the front surface are longer in the y direction than the TD anode wiring pattern 115B and the TD cathode wiring pattern 116B on the back surface and extend to the vicinity of a center portion in the y direction of the base member 100. Two terminals of the TD 45 are respectively connected to the TD anode wiring pattern 115F and the TD cathode wiring pattern 116F in the vicinity of the center portion in the y direction of the base member 100.

Then, when the base member 100 is disposed at a position surrounded by a broken line on the wiring substrate 10 shown in FIG. 8(a), the light-emitting element array anode wiring patterns 11-1 and 11-2 of the wiring substrate 10 are connected to the light-emitting element array anode wiring patterns 111-1B and 111-2B of the base member 100, and the light-emitting element array cathode wiring pattern 12 of the wiring substrate 10 is connected to the light-emitting element array cathode wiring pattern 112B of the base member 100. Similarly, the PD anode wiring pattern 13 of the wiring substrate 10 is connected to the PD anode wiring pattern 113B of the base member 100, and the PD cathode wiring pattern 14 of the wiring substrate 10 is connected to the PD cathode wiring pattern 114B of the base member 100. Further, the TD anode wiring pattern 15 of the wiring substrate 10 is connected to the TD anode wiring pattern 115B of the base member 100, and the TD cathode wiring pattern 16 of the wiring substrate 10 is connected to the TD cathode wiring pattern 116B of the base member 100.

At this time, when the TD anode wiring pattern 115B and the TD cathode wiring pattern 116B provided on the back surface of the base member 100 have the same shape as the TD anode wiring pattern 115F and the TD cathode wiring pattern 116F provided on the front surface of the base member 100, the TD anode wiring pattern 115B and the TD cathode wiring pattern 116B short-circuit the light-emitting element array cathode wiring pattern 12 of the wiring substrate 10, the TD anode wiring pattern 115B, and the TD cathode wiring pattern 116B. Therefore, the TD anode wiring pattern 115B and the TD cathode wiring pattern 116B provided on the back surface of the base member 100 have shorter lengths toward the center portion in the y direction than the TD anode wiring pattern 115F and the TD cathode wiring pattern 116F provided on the front surface of the base member 100, and do not short-circuit the light-emitting element array cathode wiring pattern 12 of the wiring substrate 10, the TD anode wiring pattern 115B, and the TD cathode wiring pattern 116B. That is, in order to dispose the TD 45 between the light-emitting element array 20 and the drive unit 50, the TD anode wiring pattern 115F and the TD cathode wiring pattern 116F are provided on the base member 100 and three-dimensionally intersect with the light-emitting element array cathode wiring pattern 12 provided on the wiring substrate 10 so as not to short-circuit the light-emitting element array cathode wiring pattern 12.

The light-emitting element array 20, the PD 40, and the TD 45 are mounted on the base member 100 before the base member 100 is disposed on the wiring substrate 10. That is, the cathode electrode 214 (see FIG. 4) of the light-emitting element array 20 is bonded onto the light-emitting element array cathode wiring pattern 112F of the base member 100 by a conductive adhesive or the like. The anode electrode 218 (see FIG. 4) of the light-emitting element array 20 and the light-emitting element array anode wiring patterns 111-1F and 111-2F are connected by the bonding wires 23A and 23B.

The cathode electrode of the PD 40 is bonded onto the PD cathode wiring pattern 114F of the base member 100 by a conductive adhesive, and the anode electrode of the PD 40 is connected to the PD anode wiring pattern 113F of the base member 100 by the bonding wire 23C. Further, one terminal of the TD 45 (a positive terminal in a case where the TD 45 has polarity) is bonded to the TD anode wiring pattern 115F of the base member 100 by a conductive adhesive or solder, and the other terminal of the TD 45 (a negative terminal in a case where the TD 45 has polarity) is bonded to the TD cathode wiring pattern 116F of the base member 100 by a conductive adhesive or solder.

As described above, in the light-emitting device 4 according to the present exemplary embodiment, the TD 45 having a small occupation area is provided between the light-emitting element array 20 and the drive unit 50 among the PD 40 and the TD 45 that are desired to be disposed close to the light-emitting element array 20, so that it is easy to bring the drive unit 50 and the light-emitting element array 20 close to each other. Since the base member 100 is used, even in a configuration in which the TD 45 is disposed between the light-emitting element array 20 and the drive unit 50, a wiring pattern (here, the light-emitting element array cathode wiring pattern 12) that connects the drive unit 50 and the light-emitting element array 20 is linearly provided without being affected by the TD 45. Accordingly, an increase in the inductance of the circuit is prevented.

In the light-emitting device 4 according to the present exemplary embodiment, the TD 45 having a small occupation area on the base member 100 is provided between the light-emitting element array 20 and the drive unit 50 among the PD 40 and the TD 45 that are desired to be disposed close to the light-emitting element array 20, so that it is easy to bring the drive unit 50 and the light-emitting element array 20 close to each other. Hereinafter, a light-emitting device 4' to which the present exemplary embodiment is not applied will be described for comparison.

(Light Emitting Device 4' According to Comparative Example)

Figure 9:
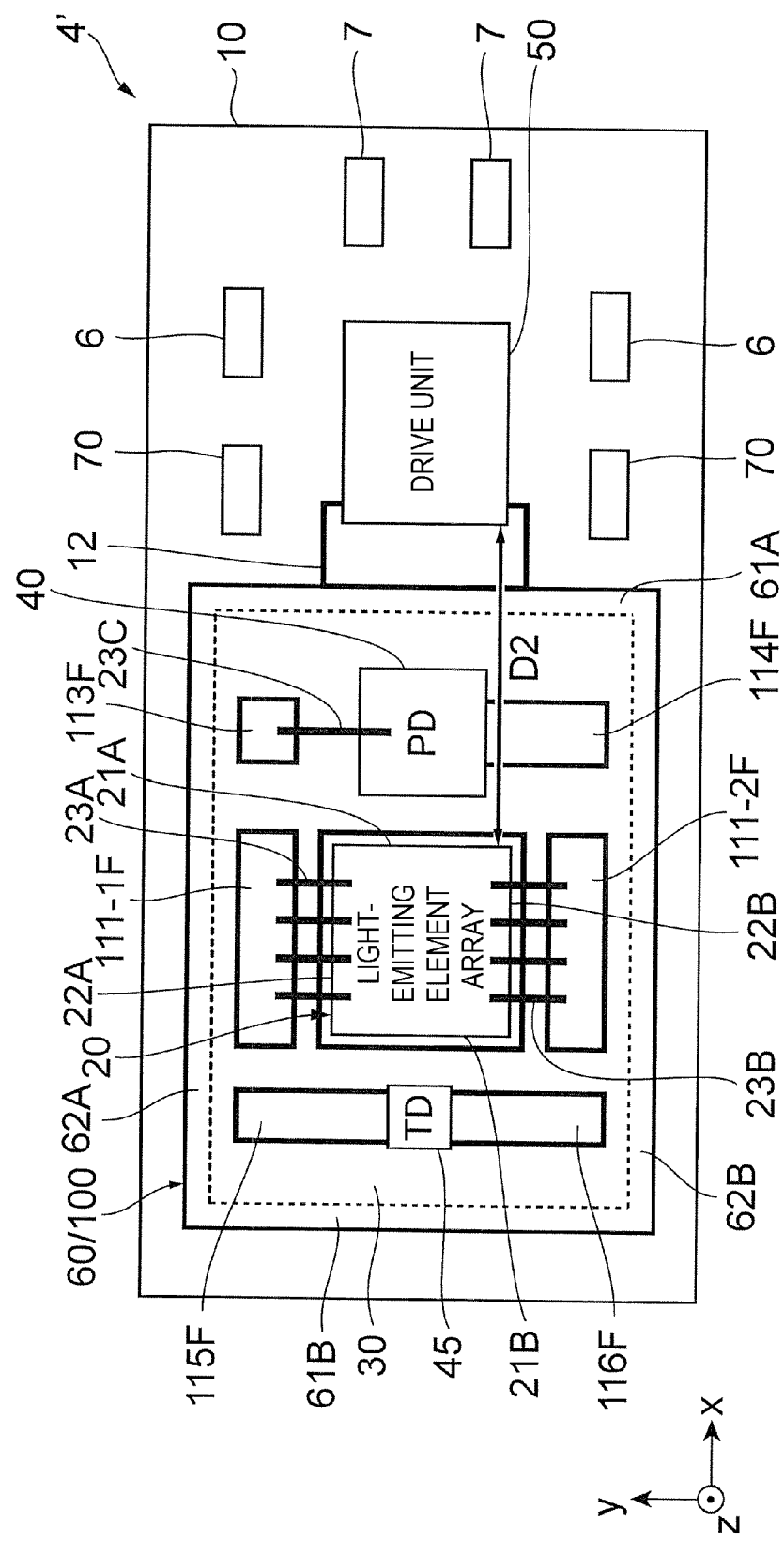
FIG. 9 is a plan view showing a light-emitting device for comparison to which the present exemplary embodiment is not applied.

FIG. 9 is a plan view showing the light-emitting device 4' for comparison to which the present exemplary embodiment is not applied.

In the light-emitting device 4', the PD 40 having a large occupation area on the base member 100 is provided between the light-emitting element array 20 and the drive unit 50. That is, positions where the PD 40 and the TD 45 are disposed in the light-emitting device 4 shown in FIGS. 7(a) to 7(c) are switched in the light-emitting device 4'. Other configurations are the same as those of the light-emitting device 4, and description thereof will be omitted.

In the light-emitting device 4', since the PD 40 having a large occupation area is provided between the light-emitting element array 20 and the drive unit 50, the distance D2 between the end portion of the light-emitting element array 20 at the drive unit 50 side and the drive unit 50 is larger than the distance D1 of the light-emitting device 4 (D2>D1). That is, since the occupation area of the PD 40 is large, it is difficult to bring the drive unit 50 and the light-emitting element array 20 close to each other.

As described above, the PD 40 occupies a larger area on the base member 100 than the TD 45. Alternatively, when the PD 40 occupies a smaller area on the base member 100 than the TD 45, the PD 40 may be provided between the drive unit 50 and the light-emitting element array 20. That is, when there are plural circuit elements desired to be disposed close to the light-emitting element array 20, a circuit element having a small occupation area on the base member 100 may be provided between the drive unit 50 and the light-emitting element array 20. Accordingly, it is easy to bring the drive unit 50 and the light-emitting element array 20 close to each other. Therefore, an increase in the inductance of the circuit is prevented.

Although the light receiving element for monitoring a light amount (PD40) is described as an example of the first circuit element, and the temperature detecting element (TD45) is described as an example of the second circuit element in the present exemplary embodiment, other circuit components such as the capacitor 70 that supplies a current to the light-emitting element array 20 may be used as a circuit element.

Although the light diffusing member 30 is used in the present exemplary embodiment, the present invention may be applied to a configuration including a member that transmits light, for example, a transparent base member such as a protective cover, and an optical member such as a condensing lens or a microlens array, instead of the light diffusing member 30.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCE SIGNS LIST 1 information processing device
2 user interface (UI) unit
3 optical device
4, 4' light-emitting device
5 3D sensor
6 resistor element
7, 70 capacitor
8 optical device control unit
9 system control unit
10 substrate
11-1, 11-2, 111-1F, 111-2F, 111-1B, 111-2B light-emitting element array anode wiring pattern
12, 112F, 112B light-emitting element array cathode wiring pattern
13, 113F, 113B PD anode wiring pattern
14, 114F, 114B PD cathode wiring pattern
15, 115F, 115B TD anode wiring pattern
16, 116F, 116B TD cathode wiring pattern
20 light-emitting element array
21A, 21B, 22A, 22B side surface
23A, 23B, 23C bonding wire
30 light diffusing member
40 PD (light receiving element for monitoring light amount)
45 TD (temperature detecting element)
50 drive unit
51 MOS transistor
52 signal generation circuit
60 holding unit
61A, 61B, 62A, 62B wall
81 shape specifying unit
82 power source
83 power source line
84 ground line
91 authentication processing unit
100 base member
200 semiconductor substrate
202 lower DBR
206 active region
208 upper DBR
210 current confinement layer
210A oxidized region
210B conductive region
214 cathode electrode
218 anode electrode
M mesa
VCSEL vertical cavity surface emitting laser element

The invention claimed is:

1. A light-emitting device comprising:
   a wiring substrate;
   a base member provided on the wiring substrate;
   a light-emitting element array that has a first side surface and a second side surface facing each other, that has a third side surface and a fourth side surface facing each other and connecting the first side surface and the second side surface, and that is provided on the base member;
   a drive unit that is provided on the wiring substrate at a side of the first side surface and drives the light-emitting element array;
   a first circuit element that is provided on the base member at the side of the first side surface;
   a second circuit element that is provided on the base member at a side of the second side surface and has a larger occupation area on the base member than the first circuit element; and
   wiring members that are provided at a side of the third side surface and at a side of the fourth side surface and extend from an upper surface electrode of the light-emitting element array toward an outer side of the light-emitting element array.

2. The light-emitting device according to claim 1,
   wherein at least one of the first circuit element and the second circuit element is a light receiving element that receives light emitted from the light-emitting element array.

3. The light-emitting device according to claim 1,
   wherein at least one of the first circuit element and the second circuit element is a temperature detecting element that detects a temperature of the base member.

4. The light-emitting device according to claim 1,
   wherein one of the first circuit element and the second circuit element is a temperature detecting element that detects a temperature of the base member, and other of the first circuit element and the second circuit element is a light receiving element that receives light emitted from the light-emitting element array.

5. The light-emitting device according to claim 1,
   wherein the wiring members that extend from the upper surface electrode of the light-emitting element array toward the outer side of the light-emitting element array are not provided between the first side surface and the first circuit element and between the second side surface and the second circuit element.

6. The light-emitting device according to claim 2,
   wherein the wiring members that extend from the upper surface electrode of the light-emitting element array toward the outer side of the light-emitting element array are not provided between the first side surface and the first circuit element and between the second side surface and the second circuit element.

7. The light-emitting device according to claim 3,
   wherein the wiring members that extend from the upper surface electrode of the light-emitting element array toward the outer side of the light-emitting element array are not provided between the first side surface and the first circuit element and between the second side surface and the second circuit element.

8. The light-emitting device according to claim 4,
   wherein the wiring members that extend from the upper surface electrode of the light-emitting element array toward the outer side of the light-emitting element array are not provided between the first side surface and the first circuit element and between the second side surface and the second circuit element.

9. The light-emitting device according to claim 1,
   wherein a light diffusing member that diffuses light emitted from the light-emitting element array toward an outer side is provided on an emission path of the light-emitting element array.

10. The light-emitting device according to claim 2,
    wherein a light diffusing member that diffuses light emitted from the light-emitting element array toward an outer side is provided on an emission path of the light-emitting element array.

11. The light-emitting device according to claim 3,
    wherein a light diffusing member that diffuses light emitted from the light-emitting element array toward an outer side is provided on an emission path of the light-emitting element array.

12. The light-emitting device according to claim 4,
    wherein a light diffusing member that diffuses light emitted from the light-emitting element array toward an outer side is provided on an emission path of the light-emitting element array.

13. The light-emitting device according to claim 5,
    wherein a light diffusing member that diffuses light emitted from the light-emitting element array toward an outer side is provided on an emission path of the light-emitting element array.

14. The light-emitting device according to claim 6,
    wherein a light diffusing member that diffuses light emitted from the light-emitting element array toward an outer side is provided on an emission path of the light-emitting element array.

15. The light-emitting device according to claim 9,
    wherein at least one of the first circuit element and the second circuit element is a light receiving element that receives light emitted from the light-emitting element array, and
    wherein the light diffusing member is provided at a position overlapping the light-emitting element array and the light receiving element in a plan view.

16. The light-emitting device according to claim 9,
    wherein one of the first circuit element and the second circuit element is a light receiving element that receives light emitted from the light-emitting element array, other of the first circuit element and the second circuit element is a circuit element other than a light receiving element, and the light diffusing member is provided at a position that does not overlap the circuit element other than a light receiving element and overlaps the light-emitting element array and the light receiving element in a plan view.

17. The light-emitting device according to claim 1,
    wherein the light-emitting element array includes a plurality of light-emitting elements connected in parallel to one another.

18. An optical device comprising:
    the light-emitting device according to claim 1; and
    a light receiving unit that receives light emitted from the light-emitting element array provided in the light-emitting device and reflected by an object to be measured,
    wherein the light receiving unit outputs a signal corresponding to a time from when the light is emitted from the light-emitting element array to when the light is received by the light receiving unit.

19. An information processing device comprising:
    the optical device according to claim 18; and a shape specifying unit that specifies a three-dimensional shape of the object to be measured based on light emitted from the light-emitting element array provided in the optical device, reflected by the object to be measured, and received by the light receiving unit provided in the optical device.

20. The information processing device according to claim 19, further comprising:
an authentication processing unit that performs an authentication processing related to use of the information processing device based on a specifying result of the shape specifying unit.

* * * * *